United States Patent [19]

Eaton et al.

[11] Patent Number: 5,445,043
[45] Date of Patent: Aug. 29, 1995

[54] HYDRAULIC SHIFT CONTROL FOR A POWER TRANSMISSION

[75] Inventors: James R. Eaton; Joseph H. Hunter, both of Carmel, Ind.

[73] Assignee: General Motors Corporation, Detroit, Mich.

[21] Appl. No.: 199,400

[22] Filed: Feb. 22, 1994

[51] Int. Cl.$^6$ .............................................. F16H 1/20
[52] U.S. Cl. ........................................................ 74/335
[58] Field of Search ................................. 74/331, 335

[56] References Cited

U.S. PATENT DOCUMENTS

| | | | |
|---|---|---|---|
| 5,009,116 | 4/1991 | Ordo et al. ........................... | 74/331 |
| 5,233,878 | 8/1993 | Klemen et al. ....................... | 74/346 |

*Primary Examiner*—Dirk Wright
*Attorney, Agent, or Firm*—Donald F. Scherer

[57] ABSTRACT

A hydraulic control for operating a five speed automatic transmission with two modulating solenoid valves. The control is particularly adapted for use with a twin countershaft automatic transmission that requires only one torque transfer device for each drive ratio. A system of valves is employed to direct the flow of the pressurized fluid necessary for the on-going actuation of each drive ratio and the simultaneously off-going deactuation of the previously actuated drive ratio. The flow control for actuating and deactuating the torque control devices is directly effected by two, two-position spool valves which operate in concert with two, two-position shuttle valves. Pressurized hydraulic fluid used to position the two-position spool valves and the two-position shuttle valves is primarily provided by two on/off solenoid control valves, but a third on/off inhibitor solenoid valve may also be employed. A failure of the electrical supply to the solenoid valves will effect a shift to the third drive ratio when the transmission is operating in the first through the fourth drive ratio, but will retain the transmission in the fifth drive ratio should the electrical failure occur while operation in that drive ratio. Similarly, the transmission will be retained in the reverse drive range should an electrical failure occur while operating in that drive range, even though the torque transfer device being utilized is also used in the forward drive range.

12 Claims, 11 Drawing Sheets

HYDRAULIC STATE LOGIC TABLE

| DRIVE RANGE | SOLENOID VALVES | | | | | PRESSURE SENSORS | | |
|---|---|---|---|---|---|---|---|---|
| | 100 | 105 | 25 | 26 | 22 | 88 | 78 | 146 |
| 1st (FORWARD RANGE) | X | | X | X | | | X | X |
| 2nd (FORWARD RANGE) | | X | | X | X | | | X |
| 3rd (FORWARD RANGE) | X | X | | | X | | | |
| 4th (FORWARD RANGE) | | | X | | X | | X | |
| 5th (FORWARD RANGE) | X | | | X | | | X | |
| REVERSE RANGE | X | | | | | X | | X |

FIG-11

HYDRAULIC SHIFT CONTROL FOR A POWER TRANSMISSION

TECHNICAL FIELD

The present invention relates generally to controls for power transmissions. More particularly, the present invention relates to hydraulic controls particularly adapted for actuating the torque transfer devices by which to effect sequential drive ratios in countershaft type automatic transmissions. Specifically, the present invention relates to a control valving mechanism for a twin countershaft automatic transmission that provides five drive ratios with only two three-way modulating solenoid valves (for actuating and deactuating the torque transfer devices that select the drive ratios) in combination with a plurality of two-position spool valves, two solenoid control valves, a solenoid inhibitor valve and two, two-position shuttle valves.

BACKGROUND OF THE INVENTION

The use of a hydraulic piston to control the position of a synchronizer sleeve is well known. A representative system of that type is shown in U.S. Pat. No. 5,233,878, issued Aug. 10, 1993, in the name of Klemen et al. and assigned to the assignee of the present invention. These systems have a double acting piston which is pressurized to translate a shift fork to predetermined operating positions. The shift fork is operatively connected with a synchronizer which—in combination with fluid operated torque transfer friction devices, generally in the nature of clutches or brakes—establishes two distinct power paths in a countershaft transmission, such as that shown in U.S. Pat. No. 5,009,116, issued Apr. 23, 1991, in the name of Ordo et al. and assigned to the assignee of the present invention. In the aforesaid two patents, a hydraulically operated shift fork controls positioning of the forward-reverse synchronizer. When the synchronizer has been positioned, the power path in the transmission is completed by engaging the appropriate fluid operated torque transfer device.

Heretofore, a plurality of mechanical, hydraulic or electrical arrangements, as well as combinations thereof, have been devised to operate the several torque transfer devices used in power transmissions to sequence the drive ratios or "gears" provided by the transmission. The present invention is directed to a simplified arrangement that is particularly adapted to effect sequential operation of a twin countershaft automatic transmission that provides five drive ratios.

SUMMARY OF THE INVENTION

It is, therefore, a primary object of the present invention to provide an improved transmission control for effecting selective sequencing of a five speed, twin countershaft, automatic transmission.

It is another object of the present invention to provide an improved transmission control, as above, wherein only two, three-way modulating, solenoid valves control the on-coming and off-going hydraulic pressures that are applied to activate and deactivate the torque transfer devices by which sequencing of the transmission through the successive drive ratios is effected.

It is a further object of the present invention to provide an improved transmission control, as above, wherein a pair of on/off solenoid valves are employed in combination with a pair of two-position spool valves to direct the flow of pressurized fluid to and from the appropriate torque transfer devices in order selectively to effect each drive ratio.

It is still another object of the present invention to provide an improved transmission control, as above, wherein only one torque transfer device is required for operating each drive ratio.

It is yet another object of the present invention to provide an improved transmission control, as above, which permits the two, three-way modulating, solenoid valves selectively to effect the application of the pressurized hydraulic fluid to the on-going torque transfer device, as well as to reduce the hydraulic pressure of the hydraulic fluid in the off-going torque transfer device—the pressurization and depressurization being timely to achieve any desired overlap between activation and deactivation of the on-going torque transfer device relative to the off-going torque transfer device.

It is a still further object of the present invention to provide an improved transmission control, as above, wherein the failure of the electrical power system during operation within the first through the fourth drive ratios in the forward drive range causes the transmission automatically to revert to the third drive ratio.

It is an even further object of the present invention to provide an improved transmission control, as above, wherein the failure of the electrical power system during operation within the fifth drive ratio in the forward drive range causes the transmission automatically to remain in the fifth drive ratio.

These and other objects of the invention, as well as the advantages thereof over existing and prior art forms, which will be apparent in view of the following derailed specification, are accomplished by means hereinafter described and claimed.

In general, a transmission control valving mechanism embodying the concepts of the present invention utilizes a source of fluid pressure. A first two-position spool valve means has a control chamber that is connected to the source of fluid pressure. Specifically, a control conduit directs the pressurized hydraulic fluid from a first on/off solenoid valve means to the control chamber in the first spool valve means through a first two-position shuttle valve in order to effect a pressure-set position of the spool valve member in that spool valve when the first on/off solenoid valve means is "on" (hydraulically open). A spring means biases the spool valve member in the first spool valve to effect a spring-set position when the first on/off solenoid valve means is "off" (hydraulically closed).

A second two-position spool valve means also has a control chamber that is connected with a source of fluid pressure through a second on/off solenoid valve means. A control passage directs pressurized hydraulic fluid from the second on/off solenoid valve means to the control chamber in the second spool valve means in order to effect a pressure-set position of the spool valve member in that spool valve when the second on/off solenoid valve means is "on" (hydraulically open). A spring means biases the spool valve member in the second spool valve for effecting a spring-set position when the second on/off solenoid valve means is "off" (hydraulically closed).

A plurality of torque transfer friction device means sequence an equal plurality of drive or gear ratios. A first modulating solenoid valve means selectively directs pressurized hydraulic fluid through the first spool valve means to selected torque transfer friction device means. A second modulating solenoid valve means selectively directs pressurized hydraulic fluid through the second spool valve means to selected of the other torque transfer friction device means.

To acquaint persons skilled in the arts most closely related to the present invention, one preferred embodiment of a an automatic transmission drive ratio control mechanism that illustrates a best mode now contemplated for putting the invention into practice is. described herein by, and with reference to, the annexed drawings that form a part of the specification. The exemplary drive ratio control mechanism is described in detail without attempting to show all of the various forms and modifications in which the invention might be embodied. As such, the, embodiment shown and described herein is illustrative, and as will become apparent to those skilled in these arts, can be modified in numerous ways within the spirit and scope of the invention; the invention being measured by the appended claims and not by the details of the specification.

BRIEF DESCRIPTION OF THE DRAWINGS

FIG. 11 is a logic table representing the hydraulic state of the solenoid valves and the modulating solenoid valves, as well as the state of the pressure sensors during the forward and reverse shift ranges.

DESCRIPTION OF AN EXEMPLARY EMBODIMENT

Figure 1:
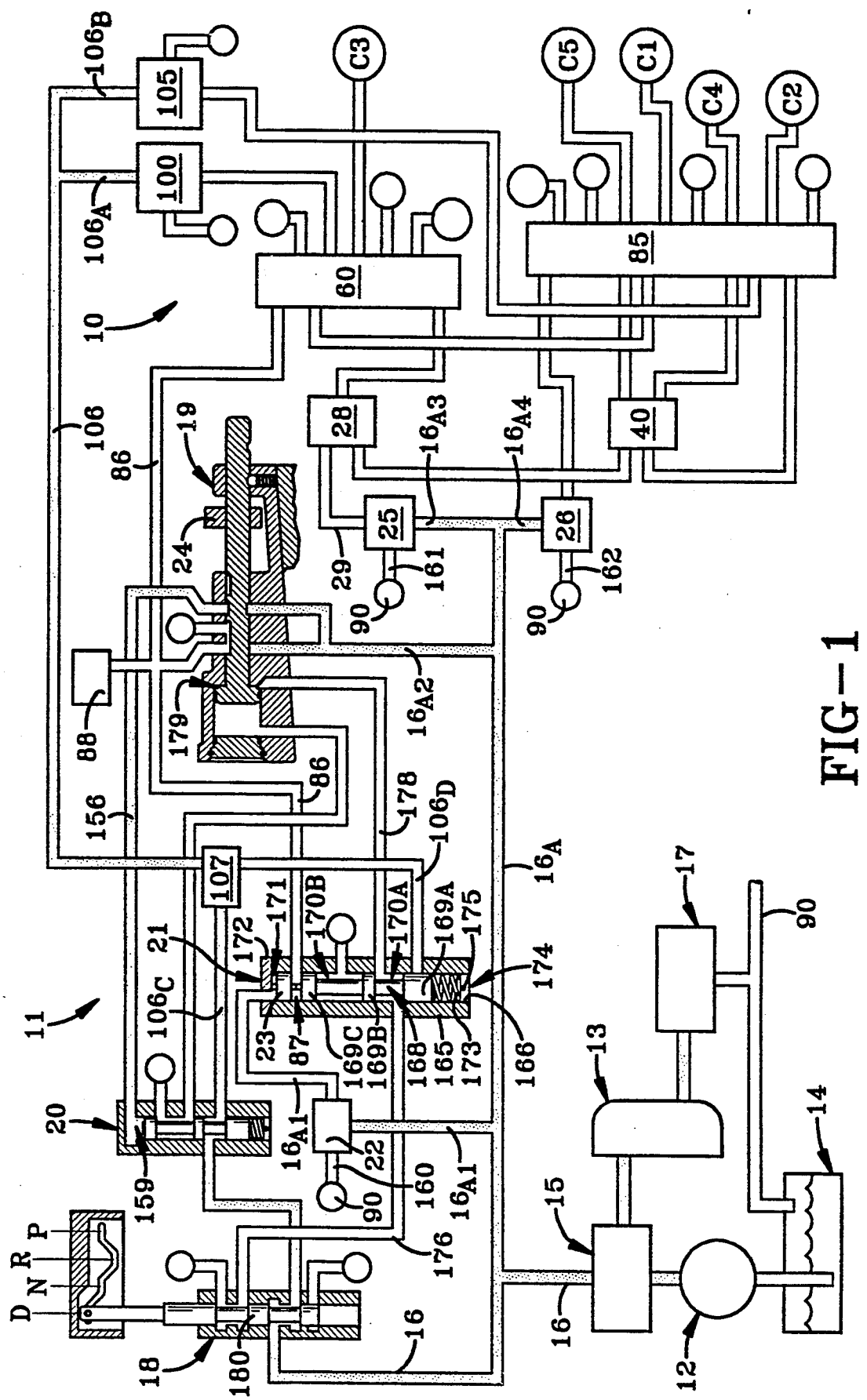
FIG. 1 is a diagrammatic representation of an overall power transmission control incorporating not only a subassembly in the nature of a shift fork controller (depicted for operation in the forward drive range), but also a subassembly in the nature of a drive ratio control valving mechanism—the latter subassembly employing the concepts of the present invention.

One form of a hydraulic control valving mechanism embodying the concepts of the present invention and adapted selectively to engage and disengage conventional torque transmitting devices—which may be in the nature of brakes and/or clutches—appropriate for a drive or gear ratio to be sequentially engaged and/or disengaged is designated generally by the numeral 10 on the accompanying drawings.

The new and novel control valving mechanism 10 is particularly suited for use in combination with the transmission shift fork control mechanism identified generally by the numeral 11 (FIG. 1) herein, but which is more particularly detailed in copending U.S. patent application, Ser. No. 08/104,967, filed on Aug. 10, 1993, in the name of Raszkowski and owned by General Motors Corporation, the assignee of the present invention.

To facilitate an understanding of the present invention, the shift fork control mechanism 11 includes means for providing a source of pressurized hydraulic fluid, such as a pump 12, that may be driven by an engine (not shown) through a conventional torque converter and power transmission assembly—the combination torque converter and transmission assembly being identified generally by the numeral 13. A countershaft type transmission, such as that shown in the aforesaid U.S. Pat. No. 5,009,116, may be driven by the torque converter in a conventional manner. The pump 12 delivers fluid from a reservoir 14 to a conventional regulator valve 15 which establishes the maximum pressure for the hydraulic fluid delivered by the main feed conduit 16. After the pressure requirement in the main feed conduit 16 is established, the excess fluid is directed to the torque converter and power transmission assembly 13, as well as to a conventional lubrication and cooling system 17, as is well known to the prior art.

The main feed conduit 16 is in fluid communication with a manual range selector valve 18 and a branch feed conduit $16_A$. The branch conduit $16_A$ feeds lateral subbranch feed conduits $16_{A1}$, $16_{A2}$, $16_{A3}$ and $16_{A4}$. Lateral subbranch feed conduit $16_{A2}$ is bifurcated to provide two conduits that communicate with shift fork controller 19, as described in detail in the aforesaid U.S. patent application, Ser. No. 08/104,967. The manual range selector valve 18 selectively controls the shift fork controller 19 via either a forward flow control valve 20 or a reverse flow control valve 21. The reverse flow control valve 21, preferred for the present invention, is uniquely modified over that disclosed in copending U.S. application, Ser. No. 08/104,967, and it will, therefore, be more fully hereinafter described.

The lateral feed branch 16$_{A1}$ incorporates a normally closed on/off inhibit control solenoid valve 22 that selectively supplies hydraulic fluid against a control drive plug 23 in the reverse flow control valve 21. This provision for supplying hydraulic pressure selectively to translate the plug 23 in the reverse flow control valve 21 is intended to provide a means by which to effect a forward-to-reverse inhibiting function, and its operation will be hereinafter more fully described.

The details of the hydraulic connections between, and the operation of, the manual range selector valve 18, the forward flow control valves 20, as well as the shift fork controller 19, are fully described in the aforesaid, copending U.S. patent application Ser. No. 08/104,967 and will not, therefore, be repeated herein except to the extent necessary to facilitate an explanation of the present invention. Suffice it to say that when the manual range selector valve 18 is disposed in the forward drive range D, as depicted on FIG. 1, pressurized hydraulic fluid provided by the pump 12 will be delivered to the feed conduits 16 at a controlled pressure, as determined by regulator 15. The regulated line pressure is then directed through manual selector valve 18, to and through the forward flow control valve 20, along branch feed passage 106c, and, by a high pressure selector shuttle valve 107, into feed passage 106 to supply the hereinafter described control valving mechanism 10.

As is described in the aforesaid U.S. patent application Ser. No. 08/104,967, when the manual range selector valve 18 is moved from neutral N to the forward drive range D pressurized fluid from the forward flow control valve 20 positions the shift fork controller 19 in the forward drive range, as depicted in FIG. 1. The shift fork controller 19 may actuate a synchronizer (not shown), as by the control fork 24 that is translated by the shift fork controller 19. It should be appreciated that if a synchronizer is not employed, the control 10 can be utilized to provide the on-going and off-going pressures required to activate the torque transfer devices used with a planetary gear set.

The termination of feed branch 16$_A$ is bifurcated into two lateral subbranch feed conduits 16$_{A3}$ and 16$_{A4}$ which communicate, respectively, with the first and second, normally closed, on/off solenoid control valves 25 and 26. The first, normally closed, on/off solenoid control valve 25 communicates with a first two-position shuttle valve 28 via a feed passage 29. As can best be seen in FIGS. 3–8, the first two-position shuttle valve 28 has a housing 30 with an axially oriented interior bore 31. A shuttle member 32, which is preferably provided with spacer stubs 33A and 33B that protrude axially outwardly from the opposite ends of the shuttle member 32, reciprocates within the plugged bore 31. The shuttle member 32, and particularly by virtue of the interaction of the axially protruding spacer stubs 33A and 33B with the housing 30 and its associated plug structure, defines first and second chambers 34 and 35, respectively, within the valve bore 31, as will be hereinafter more fully described.

As previewed in the previous paragraph, and as will be continued in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are two spacer stubs associated with the shuttle member 32. One spacer stub protrudes axially outwardly from each end of the shuttle member 32. The spacer stubs are generally identified by the numeral 33, but the specific individual spacer stubs are, therefore, identified as 33A and 33B in the specification and on the drawings. This same suffix convention shall be employed throughout the specification.

Continuing with a description of the first two-position shuttle valve 28, the feed passage 29 communicates with the first chamber 34 through an annular port 36. The first chamber 34 is continually accessible to any pressurized fluid received within the port 36 inasmuch as the spacer stub 33A engages the plug 39 in such a way as to assure that pressurized fluid introduced through port 36 will be immediately accessible to the chamber 34. A structural spacer stub is provided at each end of the shuttle member 32 in the first two-position shuttle valve 28 as well as at each end of the shuttle member 48 in the second two-position shuttle valve 40.

The first chamber 34 in the first shuttle valve 28 selectively communicates with a control conduit 38 through annular port 39. The second chamber 35 in shuttle valve 28 communicates with the second two-position shuttle valve 40 through a cross feed passage 41 that opens though an annular port 42 in the second chamber 35 of the first shuttle valve 28.

The second two-position shuttle valve 40 also has a housing 43 with an axially oriented interior bore 44. A shuttle member 45 reciprocates within the plugged bore 44. The shuttle member 45 defines first and second chambers 46 and 48 within the bore 44. The cross feed conduit 41 communicates with the first chamber 46 in the second shuttle valve 40 through an annular port 49. A signal conduit 50 similarly communicates with the first chamber 46 in the second shuttle valve 40, also through the annular port 49.

A spring-assist conduit 52 communicates with the bore 44 in the second shuttle valve 40 through an annular port 53. The spring-assist conduit 52 will communicate with either the first or the second chamber 46 or 48 depending upon the position of the shuttle member 45 within the bore 44, as will become hereinafter more fully explained in conjunction with the operation of the control 10. A blocking signal conduit 54 also communicates with the second chamber 48 through an annular port 55.

A first two-position spool valve is designated generally by the numeral 60. The spool valve 60 is comprised of a housing 61 which defines an axially oriented bore 62. A spool member 63, having a plurality of axially spaced radially extending lands 64, is disposed within the bore 62 for axial reciprocation. A first subchamber 65A is defined between axially spaced lands 64A and 64B; a second subchamber 65B is defined between axially spaced lands 64B and 64C; and a third subchamber 65C is defined between axially spaced lands 64C and 64D. Additionally, a control chamber 66 is defined between the land 64D and the end face 68 of bore 62.

Figure 3:
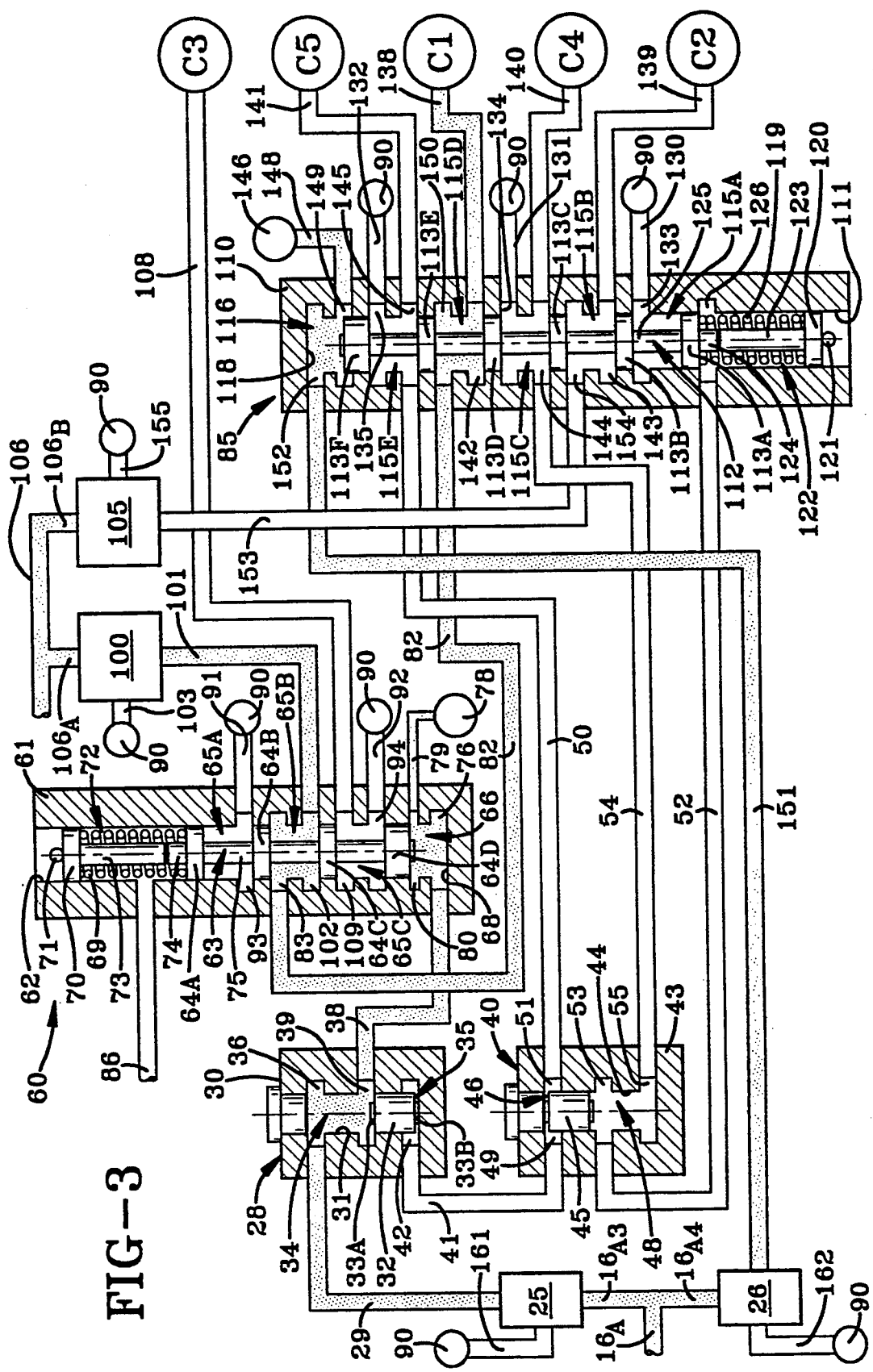
FIG. 3 is an enlarged area of FIG. 1 presented in cross-sectional elevation to focus more clearly on the drive ratio control valving mechanism, and particularly the valving arrangement by which to control the on-coming and off-going fluid pressure to the several torque transfer devices by which the specific drive or gear ratio is selected for the forward drive range condition—the valving arrangement being depicted to effect operation of the transmission in the first drive ratio in the forward drive range.
Figure 4:
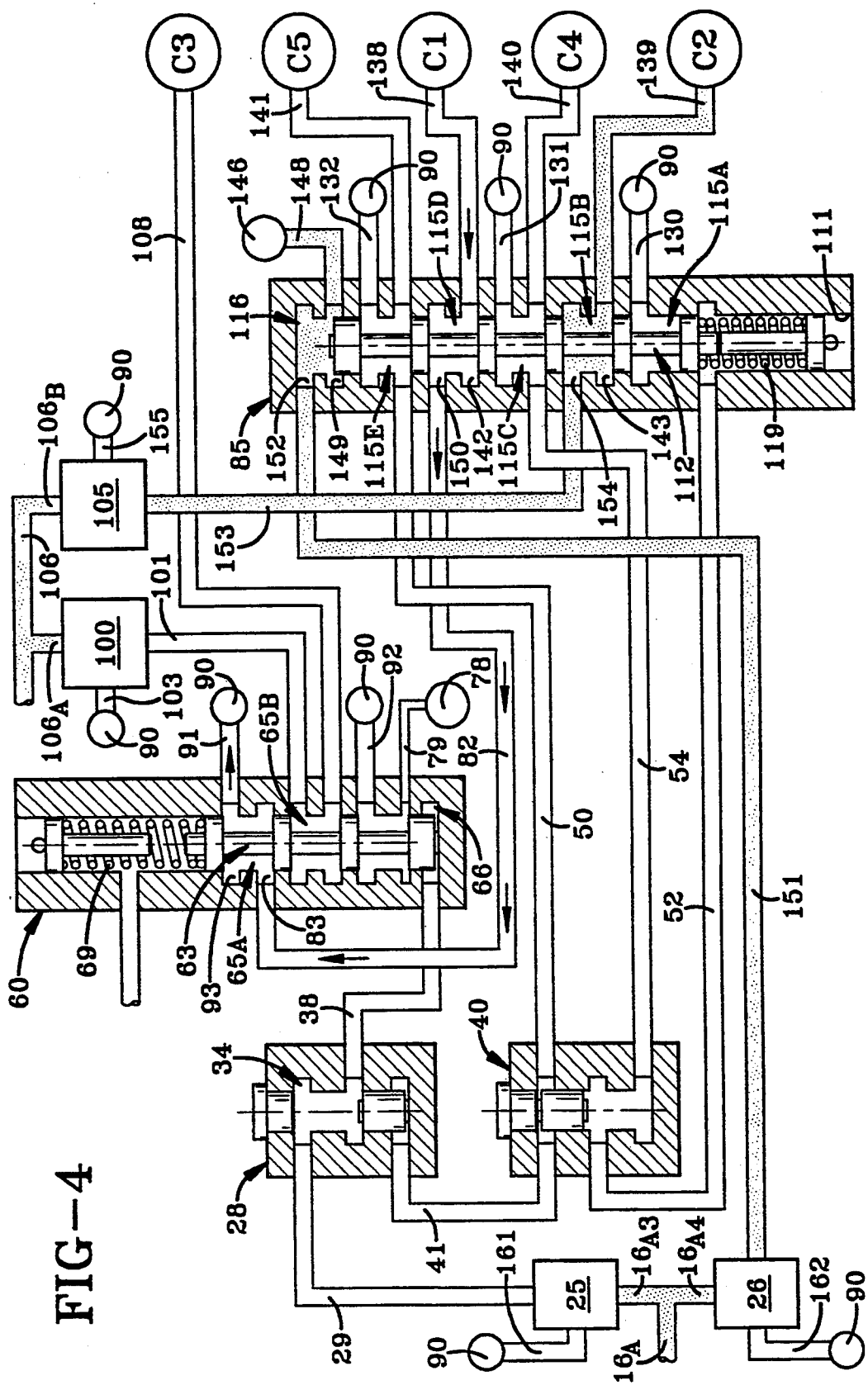
FIG. 4 is a view similar to FIG. 3, but with the valving arrangement depicted to effect operation of the transmission in the second drive ratio.
Figure 5:
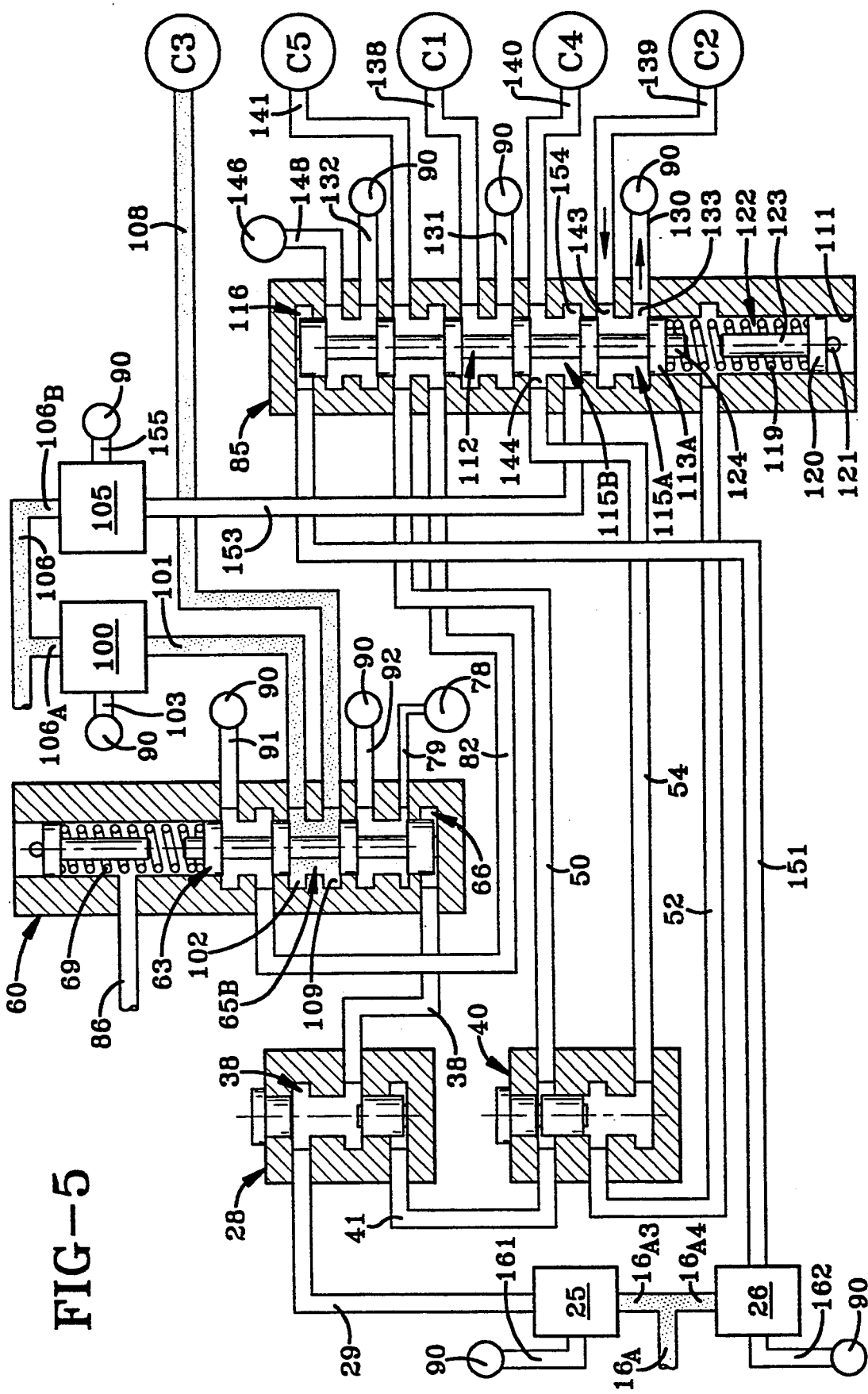
FIG 5 is a view similar to FIGS. 3 and 4, but with the valving arrangement depicted to effect operation of the transmission in the third drive ratio.

The spool member 63 is biased within the bore 62 to the spring-set position depicted in FIGS. 4 and 5, principally by virtue of a spring member 69 that acts between the land 64A and a reaction/closure plate 70 retained within the open end of the bore 62 by an anchor pin 71. The reaction/closure plate 70 also serves to define a spring-assist chamber 72 between it and the land 64A. A locating stub shaft 73 extends axially outwardly from the reaction/closure plate 70 to be engaged by the protruding end 74 of the shaft portion 75 when the spool member 63 is in the pressure-set position, depicted in FIGS. 3 and 6 through 8. As such, it must be appreciated that the engagement of the locating stub shaft 73 with the protruding end 74 defines the pressure-set position of the spool member 63. It should also be appreciated that the shaft portion 75 and the lands 64 comprise the spool valve member 63.

The control conduit 38 communicates with the control chamber 66 through an annular port 76. The control chamber 66 also communicates with a pressure sensor 78 through a signal passage 79—when the spool valve member 63 is in the pressure-set position, depicted in FIGS. 3 and 6 through 8—that is fed through an annular port 80. The first/fifth drive ratio conduit 82 communicates with the bore 62 through an annular port 83. The specific subchamber 65 with which the various conduits and passages communicate will vary depending upon the position of the spool valve member 63, and for that reason, a discussion of the specific communication path through the spool valve 60 will be deferred until the operation of the control valving mechanism 10 is described. At this point, therefore, it shall only be noted that the first/fifth drive ratio conduit 82 also communicates with a second spool valve 85, as will be hereinafter more fully described.

Figure 2:
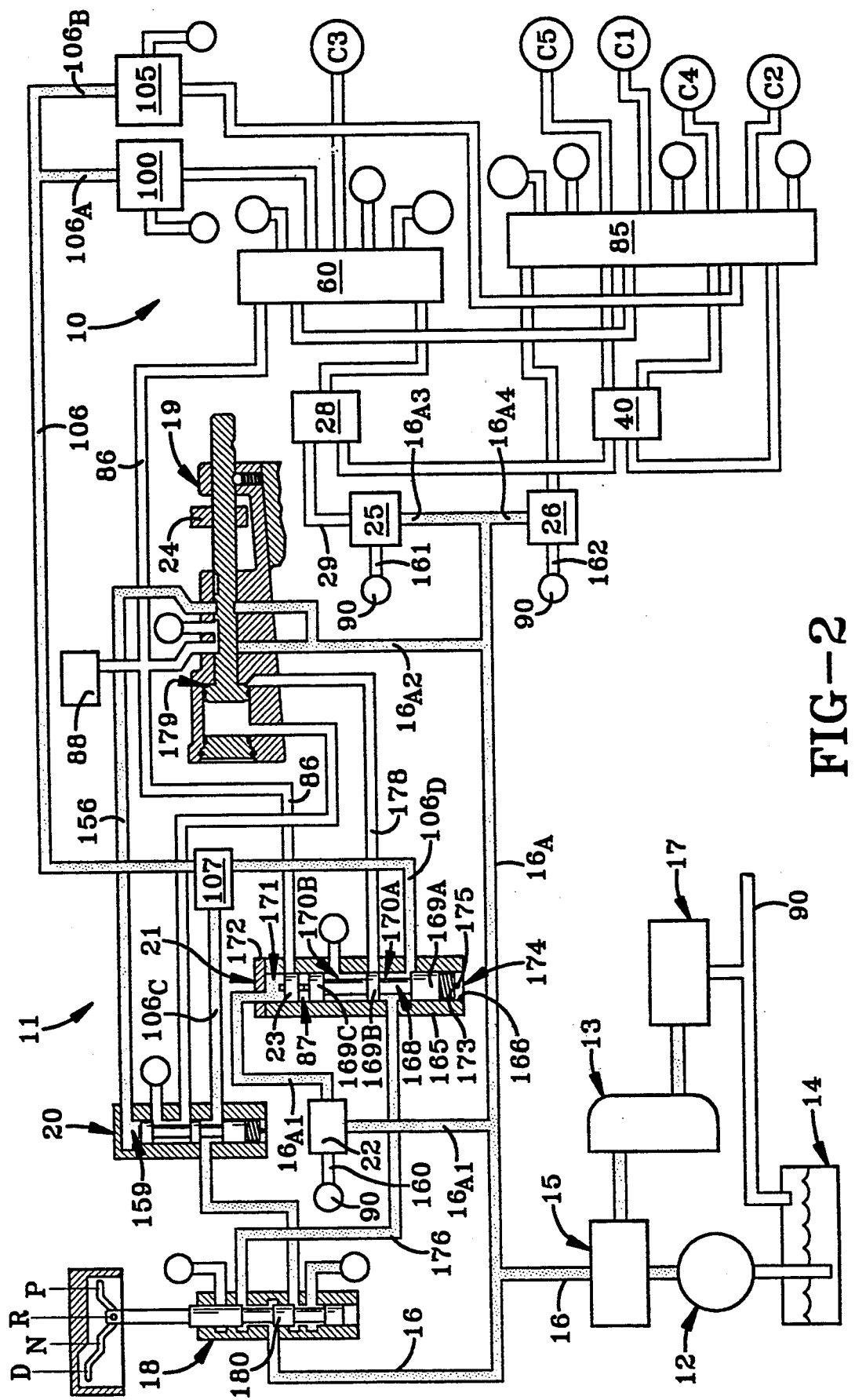
FIG. 2 is diagrammatic representation similar to FIG. 1, except that the inhibit valve has been opened to pressure-set the reverse flow control valve, such that the shift fork controller system will maintain operation in the forward drive range even though the manual range selector valve is inadvertently moved to the reverse drive range from the forward drive range while the transmission is operating in any of the second through the fifth drive ratios in the forward drive range.
Figure 9:
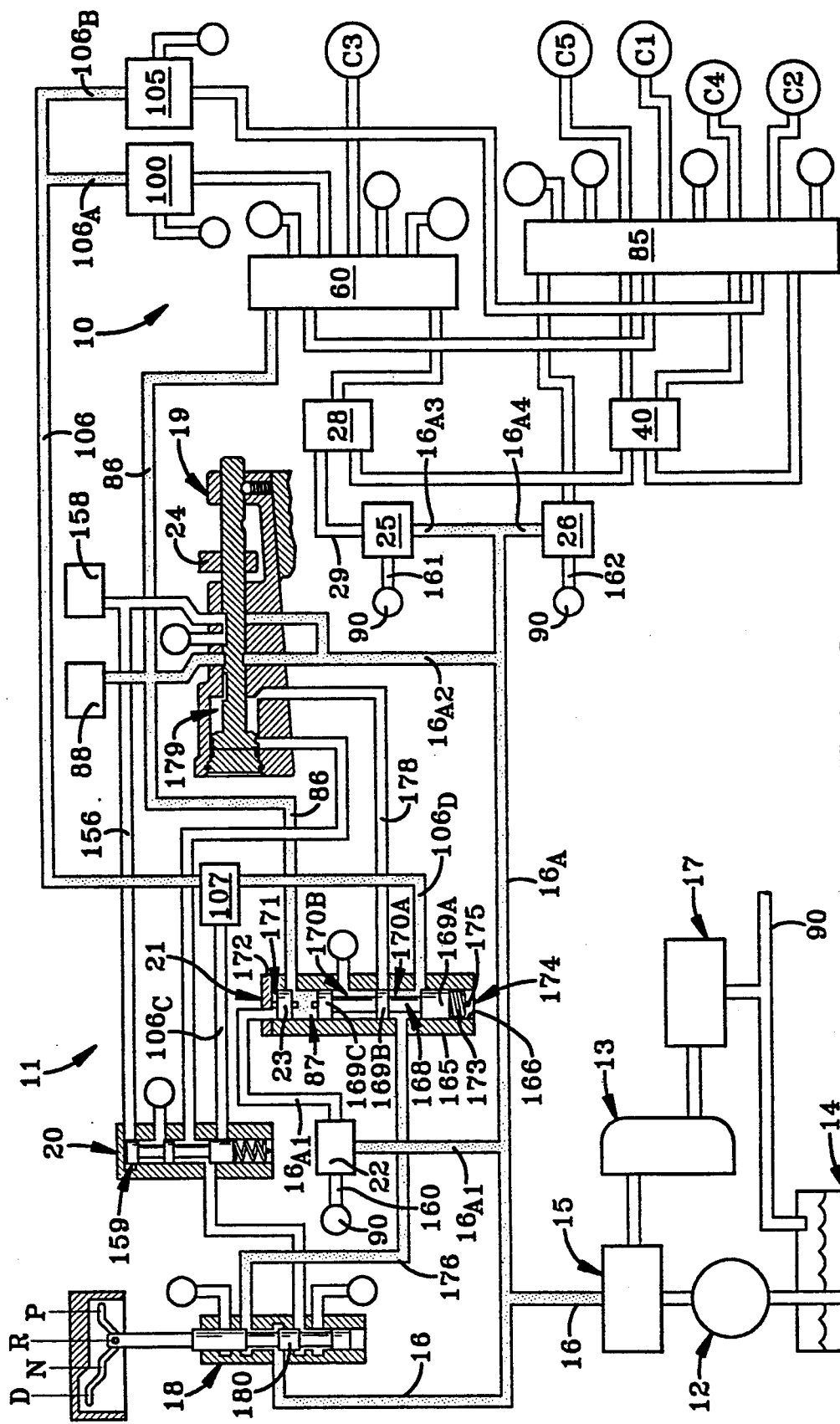
FIG. 9 is a view similar to FIGS. 1 and 2, but with the shift fork controller depicted for operation of the transmission in the reverse drive range.

The spring-assist chamber 72 communicates with a signal conduit 86, and the signal conduit 86, in turn, communicates with a signal control subchamber 87 in the reverse flow control valve 21 (FIGS. 1, 2 and 9). The signal conduit 86 also communicates with a pressure sensing switch 88. The pressure sensing switch 88 supplies a "reverse" operation signal for the shift fork control mechanism described in the aforesaid U.S. patent application Ser. No. 08/104,967, and it serves the additional function of signalling a forward/reverse range inhibit state for the first spool valve 60 in the present control 10 as is more fully described in conjunction with FIG. 10.

A hydraulic return system 90—which directs hydraulic fluid back to the reservoir 14 (FIG. 1 )—communicates with the bore 62 at two axially spaced locations. Specifically, two drain or exhaust conduits 91 and 92 effect communication between the return system 90 and the bore 62 at annular ports 93 and 94, respectively. The first three-way modulating solenoid valve 100 also communicates with the bore 62 through a transfer conduit 101 that opens to an annular port 102 which circumscribes the axial bore 62. The first three-way modulating solenoid valve 100 also communicates with the return system 90 through an exhaust conduit 103.

The first three-way modulating solenoid valve 100, as well as a second three-way modulating solenoid valve 105, are supplied with hydraulic fluid at substantially the line pressure provided to the manual range selector valve 18 by the main feed conduit 16. Specifically, and as was explained in detail in copending U.S. patent application. Ser. No. 08/104,967, line pressure is selectively fed through the manual range selector valve 18 to the forward or reverse flow control valves 20 or 21, respectively, and through one or the other of the flow control valves 20 or 21 to the feed passage 106. The solenoid feed passage 106 thereby provides hydraulic fluid at line pressure to the three-way modulating solenoid valves 100 and 105 through the respective branch feed passages $106_A$ and $106_B$. In the prior art arrangement, the feed passage 106 connects directly with the forward and reverse flow valves 20 and 21, but the control valving mechanism 10 embodying the concepts of the present invention requires the incorporation of a shuttle valve which selectively connects one of the other of the flow control valves 20 and 21 to the feed passage 106. Hence, as depicted in FIGS. 1, 2 and 9, the high pressure selector shuttle valve 107 is provided at the intersection of the feed passage 106 with the branches $106_C$ and $106_D$—branch $106_C$ connecting the forward flow control valve 20 to the high pressure selector shuttle valve 107, and branch $106_D$ connecting the reverse flow control valve 21 to the high pressure selector shuttle valve 107.

To conclude the structural description of the first two-position spool valve 60, the third/reverse drive ratio conduit 108 communicates with the bore 62 through an annular port 109. Here, too, the specific subchamber 65 with which the third/reverse drive ratio conduit 108 will communicate during the operation of the control valving mechanism 10 will be hereinafter fully described in conjunction with the explanation as to the operation of that mechanism.

The second two-position spool valve 85 is also comprised of a housing 110 which defines a cylindrical bore 111. A spool member 112, having a plurality of axially spaced, radially extending lands 113 is disposed within the cylindrical bore 111 for axial reciprocation. A first subchamber 115A is defined between the lands 113A and 113B; a second subchamber 115B is defined between lands 113B and 113C; a third subchamber 113C is defined between lands 113C and 113D; a fourth subchamber 115D is defined between lands 113D and 113E; and, a fifth subchamber 115E is defined between lands 113E and 113F. Additionally, a control chamber 116 is defined between the land 113F and the end face 118 of bore 111.

The spool member 112 is biased within the bore 111 to the spring-set position, depicted in FIGS. 5-8, by the action of a spring member 119 that acts between land 113A and a reaction/closure plate 120 which is, in turn, retained within the open end of the cylindrical bore 111 by an anchor pin 121. The reaction/closure plate 120 also serves to define one wall of a spring-assist chamber 122 which extends between the land 113A and the reaction/closure plate 120.

A locating stub shaft 123 extends axially outwardly from the reaction/closure plate 120 to be engaged by the protruding end 124 of the shaft portion 125 of the second spool valve member 112 when the spool valve member 112 is in the position depicted, for example, in FIG. 3. Thus, engagement of the locating stub shaft 123 with the protruding end 124 defines the pressure-set position of the spool valve member 112.

The spring-assist conduit 52 communicates with the spring-assist chamber 122 through an annular port 126. The hydraulic return system 90 communicates with the bore 111 at three axially spaced locations through exhaust conduits 130, 131 and 132 that open into the bore 111 through annular exhaust ports 133, 134 and 135, respectively.

The feed conduits 138, 139, 140 and 141 for the hydraulic torque transfer devices C1, C2, C4 and C5, respectively, communicate individually with the bore 111 of the second spool valve 85 through their respective annular ports 142, 143, 144 and 145. A sensor 146 communicates with the control chamber 116 in bore 111 by a signal conduit 148 that opens through an annular port 149.

The blocking signal conduit 54, which opens to chamber 48 in the second two-position shuttle valve 40 through annular port 55, also communicates with the bore 111 in the second spool valve 85 through the annular port 144. The signal conduit 50—which opens to chamber 46 in the second two-position shuttle valve 40 through annular port 51—also communicates with the bore 111 in the second spool valve 85 through annular port 145.

The first/fifth drive ratio feed conduit 82, which communicates with the bore 62 in the first spool valve 60 through annular port 83, also communicates with the bore 111 in the second spool valve 85, as through the annular port 150.

The second, normally closed, or/off solenoid control valve 26 communicates with the control chamber 116 in the second spool valve 85 via feed passage 151 that opens into the bore 111 through annular port 152.

The second three-way modulating solenoid valve 105 communicates with the bore 111 in the second spool valve 85 through a transfer conduit 153 that opens into an annular port 154. The second three-way modulating solenoid valve 105 also communicates with the return system 90 through exhaust conduit 155.

Before embarking on a description as to the operation of the control valve mechanism 10 to which the present invention is directed, it should be understood that the explanation begins with a recapitulation as to the hydraulic fluid flow accomplished by positioning the manual range selector valve 18 in the forward drive D position (FIGS. 1 and 2). Specifically, the regulated line pressure fed from the pump 12 through the main feed conduit 16 passes through the manual range selector valve 18, through the forward flow control valve 20, along branch feed passage 106C and into feed passage 106, as permitted by the high pressure response of the selector shuttle valve 107. The pressurized hydraulic fluid is then presented at both the first and second three-way modulating solenoid valves 100 and 105 through branch passages 106$_A$ and 106$_B$, respectively.

The previously described, flow is achieved by virtue of the shift fork controller 19 having been disposed in the forward set position, depicted in FIG. 1, such that the hydraulic fluid passing through branch 16$_A$ at regulated line pressure will not only be available at the respective first and second on/off solenoid control valves 25 and 26, but will also have passed into lateral subbranch 16$_{A1}$ to feed the normally closed, on/off solenoid inhibit valve 22, as well as into the lateral subbranch 16$_{A2}$ which accesses conduit 156 through the shift fork controller 19. Conduit 156 feeds the control chamber 159 in the forward control valve 20, whereby that valve is activated to permit the flow of pressurized hydraulic fluid through the forward flow control valve 20, as previously described.

It should also be noted that each of the on/off solenoid valves 22, 25 and 26 also communicate with the return system 90, as through the respective exhaust conduits 160, 161 and 162 when the referenced valve 22, 25 and/or 26 is in the "off" or hydraulically closed state. The three-way modulating solenoid valves 100 and 105 similarly communicate with the return system 90 through exhaust conduits 103 and 155, respectively. Thus, when either of the three-way modulating solenoid valves 100 or 105 are closed, the transfer conduits 101 or 153 communicating with the closed three-way modulating solenoid valves 100 and/or 105, respectively, will communicate through the closed modulating solenoid valve with the return system 90.

For ease of viewing, the pressurized conduits and passages have been stippled, and that same convention will be employed in the remainder of the explanation to follow.

For those desiring a more detailed explanation as to the operation of the shift fork controller 19 in response to the aforementioned disposition of the manual range selector 18 in the forward drive position D, reference should be had to the aforesaid, copending U.S. patent application, Ser. No. 08/104,967.

Finally, some attention should also be directed to the forward-to-reverse, normally off, on/off solenoid inhibit valve 22 and its interaction with a uniquely modified reverse flow control valve 21. A full understanding of the interaction between the inhibit valve 22 and the reverse flow control valve 21 is particularly important inasmuch as the solenoid inhibit valve 22 is hydraulically open or "on" during operation of the second through the fifth drive ratios in the forward drive range D in order to preclude inadvertent shifting into the reverse drive range R. As such, operatively shifting into the reverse range R can only be accomplished from either the first drive ratio in the forward drive range D, the neutral position N or the park position P of the manual range selector valve 18.

It should be observed that the unique reverse flow valve 21 has a housing 165 which defines a cylindrical bore 166. A spool member 168, having a plurality of axially spaced radially extending lands 169, is disposed within the bore 166 for axial reciprocation. A first subchamber 170A is disposed between lands 169A and 169B, and a second subchamber 170B is disposed between lands 169B and 169C.

The control plug 23 is disposed in axial alignment with the spool member 168, and the control plug 23 also reciprocates axially within the bore 166. The signal control subchamber 87 is located between the land 169C and the plug 23, and the signal conduit 86 communicates with the signal control subchamber 87. A control subchamber 171 is disposed between the plug 23 and the opposed end wall 172 of the housing 165, and the branch conduit 16$_{A1}$ communicates with the control subchamber 171. The spool member 168 is biased within bore 166 to a spring-set position by virtue of a compression spring 173 that is retained within the open end 174 of the bore 166, as by a transversely oriented retainer pin 175.

Without actuation of the normally closed on/off solenoid inhibit valve 22, the reverse flow control valve 21 is spring-set to the position depicted in FIG. 1, such that when the manual range selector valve 18 is positioned in the reverse range R, pressurized hydraulic fluid flows from the main feed conduit 16 through the manual range selector valve 18 into the reverse supply conduit 176 to the reverse flow control valve 21 and through the flow control valve 21 into the reverse fork actuation passage 178. The reverse fork actuation passage 178 supplies pressurized hydraulic fluid into the reverse chamber 179 in the shift fork controller 19, as is described in detail in copending U.S. application Ser. No. 08/104,967. As the shift fork controller is moved to the reverse position (FIG. 9), pressurized hydraulic fluid is introduced into the signal conduit 86, which supplies the signal control subchamber 87.

The presence of pressurized fluid within the signal control subchamber 87 serves to effect axial separation of the spool member 168 from the control drive plug 23 which permits the pressurized fluid in the reverse supply conduit 176 to pass through the reverse flow control valve 21 and into the feed passage branch $106_D$, as depicted in FIG. 2. With the forward flow control valve 20 in the spring-set position, the pressurized fluid in the feed passage branch $106_D$ will actuate the select or shuttle valve 107 to permit flow from the feed passage branch $106_D$ into feed passage 106, as represented in either FIG. 2 or 9. Thus, the reverse flow control valve 21 initially directs pressurized hydraulic fluid from the manual range selector valve 18 to the shift fork controller 19 in order to establish the reverse drive range. After the reverse range is established, the pressurized fluid is directed to the feed passage 106 for supplying the modulating, solenoid valves 100 and 105.

The solenoid inhibit valve 21 is, as will be hereinafter more fully apparent, activated in conjunction with selected drive ratios in the forward drive range. In the spring-set position of the reverse flow control valve 21 it will, as described in the previous paragraph, direct fluid flow from the manual selector valve 18 to the reverse chamber 179 in the shift fork controller 19, and in response to the resulting positioning of the shift fork controller 19 in the reverse position, pressurized fluid is returned to the signal control subchamber 87 in the reverse flow control valve 21 so that the flow control valve 21 will supply pressurized hydraulic fluid to the feed passage 106. However, when the inhibitor valve 22 is opened—i.e.: turned hydraulically "on"—pressurized fluid will flow through the inhibitor valve 22 and into the control subchamber 171 and translate the control drive plug 23 downward to establish a pressure set position for the reverse flow control valve 22, even when the shift fork controller 19 is in the forward position depicted in FIGS. 1 and 2.

As a result, should the vehicle operator move the manual selector valve 18 to the reverse position when the control valving mechanism 10 is in any of the second through the fifth drive ratios, the inhibit valve 21 will divert flow into the feed passage 106 rather than permit the shift fork controller 19 to be moved into the reverse drive position. Hence, even though the pressurized fluid will be flowing through the reverse flow control valve 21 rather than the forward flow control valve 20, the fluid will still be applied to the modulating solenoid valves 100 and 105. Inasmuch as the pressure sensor 88 is not activated under that condition, the logic circuit (not shown) will not alter the state of the forward drive ratio and pressurized hydraulic fluid to the torque transfer device will only be interrupted for the infinitesimally short time it takes for the operator to have moved the manual range selector valve 18 from the forward drive range D to the reverse drive range R. A return to the neutral N, park P or forward drive range position D of the manual range selector valve 18 will rectify the error.

In the neutral N position of the manual range selector valve 18, the middle land 180 of the manual range selector valve 18 blocks the flow of pressurized hydraulic fluid into or through the valve 18.

OPERATION

By way of background, it should be understood that motor vehicle transmissions generally include selectively engageable gear elements for providing multiple forward speed or drive ratios through which the output torque of the engine is applied to the drive wheels of the vehicle. In automatic transmissions, the gear elements which pro,dale the various drive ratios are selectively activated, as through fluid operated torque transfer friction devices, such as clutches and brakes. Thus, shifting from one drive ratio to another, generally involves releasing (disengaging) the torque transfer device(s) associated with the current drive ratio and applying (engaging) the torque transfer device(s) associated with the successive drive ratio. Any torque transfer device to be released during a particular shift sequence is conventionally referred to as the off-going torque transfer device, while the torque transfer device to be applied during that same shift sequence is referred to as the on-coming torque transfer device. There is generally a slight overlap between the "release" and "apply" of the torque transfer devices involved in a shift sequence, and high quality shifts are achieved only when the "release" and "apply" operations are properly timed and executed.

Conventionally, the shifting control effected by an automatic transmission is performed in conjunction with a logic control map and various input which reflect such system parameters as vehicle speed, engine throttle position and engine torque. Fluid pressure signals representative of the various system parameters are processed in an on-board computer and/or microprocessor to determine when a shift is in order and to actuate, in accordance with the logic control map, electronically controlled valves in the hydraulic control system which respond to the signals received from the computer to effect the required engagement and/or disengagement (and in the proper order) of the appropriate torque transfer devices necessary to secure the desired drive ratio changes to the output shaft of the transmission.

Actuation Of the First Drive Ratio

The first drive or gear ratio is available after the manual range selector valve 18 has been shifted from the neutral N to the forward drive D range position, as depicted in FIG. 1, which makes the pressurized hydraulic fluid available at the first and second modulating solenoid valves 100 and 105. The first drive range is established by actuating the on-going torque transfer friction device C1. With particular reference to FIG. 3, it can be seen that the first drive ratio torque transfer device C1 its properly actuated when both the first and second on/off solenoid shift control valves 25 and 26, as well as the first three-way modulating solenoid valve 100, are in the hydraulically "on" state. The second three-way modulating solenoid valve 105, however, is in the hydraulically "off" state. As such, the flow of hydraulic fluid at substantially line pressure is directed through the first, normally closed, on/off solenoid control valve 25 and into the first chamber 34 of the first two-position shuttle valve 28 via the feed passage 29. The shuttle member 32 is thereby translated into the position depicted in FIG. 3, if it is not already in that position. With the shuttle member 32 so positioned—which is depicted as the "down" position—the pressurized hydraulic fluid is permitted to pass through chamber 34 and the control conduit 38 into the control chamber 66 in the first two-position spool valve 60, as represented by the stippling of the pressurized portions. When sufficient fluid pressure is established within the control chamber 66 to overcome the biasing action of the spring member 69, the spool member 63 is translated into the pressure-set position depicted in FIG. 3.

Simultaneously, the flow of hydraulic fluid at substantially line pressure, also represented by the stippling on FIG. 3, is directed through the second, normally closed, on/off solenoid shift control valve 26, along the feed passage 151 and into the control chamber 116 of the second two-position spool valve 85, as is also represented by stippling the pressurized portions. When sufficient fluid pressure is established in the control chamber 116 to overcome the biasing pressure of the spring member 119, the spool member 112 is translated into the pressure-set position depicted in FIG. 3.

The pressure-set position of the spool member 63 in the first spool valve member 60 allows pressurized hydraulic fluid in control chamber 66 to activate pressure sensor 78, and the pressure-set position of the spool member 112 in the second spool valve 85 allows the pressurized hydraulic fluid within control chamber 116 to activate pressure sensor 146. Pressure sensor 88 remains deactivated. Pressure activation of both sensors 78 and 146 signals the customarily employed logic circuit in the on-board computer and/or microprocessor (not shown) that the control valving mechanism 10 is disposed appropriately for operation within the first, and also for shifting to, the second drive ratio, as will be hereinafter described. The hydraulic state of the on/off solenoid shift control valves 22, 25 and 26, the hydraulic state of the three-way modulating solenoid valves 100 and 105, as well as the hydraulic state of the pressure sensing switches 78, 88 and 146, are depicted in the logic table represented in FIG. 11. The x designation on the logic table indicates that the solenoid and/or the solenoid valve so designated is hydraulically "on". Similarly, the x designates that the pressure sensor is pressurized.

With the first and second spool valves 60 and 85, respectively, both in the pressure-set position, pressurized hydraulic fluid is directed from the branch feed passage 106$_A$ through the open first three-way modulating solenoid valve 100 along the transfer conduit 101 and into the subchamber 65B, through annular port 102, in the first spool valve 60. From subchamber 65B in the first spool valve 60, the pressurized hydraulic fluid is transmitted through the first/fifth drive ratio conduit 82 and into subchamber 115D in the second spool member 85 through the annular port 150. From the subchamber 115D, the pressurized hydraulic fluid passes outward, through annular port 142, and along feed conduit 138 to activate the torque transfer device C1 which effects operation of the first drive ratio.

As should be apparent, the particular disposition of the spool valves 60 and 85, with only the first three-way modulating solenoid valve 100 hydraulically open, permits hydraulic fluid only to activate the first drive ratio torque transfer device C1. Upshifting out of the first drive ratio may be accomplished by turning the first modulating solenoid valve 100 "off." With the first solenoid valve turned off, the pressurized hydraulic fluid in torque transfer device C1 backflows along the first drive ratio conduit 138, through subchamber 115D in the second spool valve 85, along the first/fifth drive ratio conduit 81 and through subchamber 65B in the first two-position spool valve 60. From subchamber 65B, the pressurized hydraulic fluid passes through transfer conduit 101 into the first modulating solenoid valve 100 to exit into the return system 90 through exhaust conduit 103.

In any event, once the aforesaid shift to the first drive ratio is completed—but only after the on-board computer and/or microprocessor has signalled (as a part of the pre-shift logic) that preparation for the shift from the first to the second drive ratio should be instituted—the inhibit solenoid is turned "on", as depicted in FIG. 2. Turning the inhibit solenoid 22 "on", as was previously described, precludes a shift from the second drive ratio in the forward drive range directly into the reverse drive range.

Actuation of the Second Drive Ratio

The second drive ratio is established with the control valving mechanism 10 disposed as depicted in FIG. 3. That is, the on-going torque transfer device C2 is engaged, and the off-going torque transfer device C1 is substantially simultaneously disengaged, although, as previously noted, a slight overlap is generally deemed desirable, as is well known to the art. This sequencing from the first to the second drive ratio is controlled by opening the second three-way modulating solenoid valve 105 to engage the torque transfer friction device C2 and closing the first three-way modulating solenoid valve 100 to effect depressurization of the torque transfer device C1.

Closure of the three-way modulating solenoid valve 100 permits depressurization of the torque transfer device C1 at a predetermined rate. When valve 100 closes, the pressurized fluid within the torque transfer device C1 flows back through the chamber 115B in the second spool valve 85, along the first/fifth conduit 82 and through chamber 65B in the first spool valve 60 and into the first modulating solenoid valve 100 by transfer conduit 101. The exhaust conduit 103 communicates between the transfer conduit 101 and the return system 90 when the first modulating solenoid valve 100 is closed. At this point in the operation of the control valving mechanism 10, all components thereof are disposed as depicted in FIG. 3.

Opening the second three-way modulating solenoid valve 105 permits the flow of pressurized hydraulic fluid to pass from the branch feed passage 106B into the control mechanism 10. Specifically, fluid flow is directed from the second three-way modulating solenoid valve 105 via the transfer conduit 153 into subchamber 115B through annular port 154. The subchamber 115B is now in fluid communication with the torque transfer friction device C2 through the second drive ratio feed conduit 139, which communicates with subchamber 115B through annular port 143. The pressurized hydraulic fluid admitted to the control valving mechanism 10 through the second three-way modulating solenoid valve 105 thus activates the second drive ratio.

The line pressures described to actuate torque transfer friction device C2 by opening the second modulating solenoid 105 are depicted by the stippling in FIG. 4. Before discussing FIG. 4, however, it can be observed that with the components disposed as depicted in FIG. 3, one can also effect a downshift simply by closing the second modulating solenoid valve 105 and opening the first modulating solenoid valve 100.

Once the aforesaid shift to the second drive ratio is completed—but only after the on-board computer and/or microprocessor has signalled (as a part of the preshift logic) that preparation for the shift from the second to the third drive ratio should be instituted—the first solenoid valve 25 is turned "off" so that the passage of hydraulic fluid therethrough is precluded. However, the second solenoid valve 26 remains in the "on" state so that the passage of pressurized hydraulic fluid therethrough is maintained.

Turning the first solenoid valve 25 "off" causes the hydraulic fluid in control chamber 66, particularly in response to the biasing action of spring 69, to backflow through control conduit 38 into and through the first chamber 34 in the first shuttle valve 28 and then through feed passage 29 into the first solenoid valve 25. From the solenoid valve 25, the fluid exits into the return system 90 through exhaust conduit 161. The first two-position spool valve 60 thus returns to the spring-set position (FIG. 4).

Returning to the spring-set position of the spool member 63 in the first spool valve member 60 precludes further pressurization of control chamber 66, and thus the pressure sensor 78 is no longer activated. On the other hand, the pressure-set position of the spool member 112 in the second spool valve 85 allows the pressurized hydraulic fluid within control chamber 116 to maintain the activation of pressure sensor 146. Pressure sensor 88 remains deactivated. The activation of only sensor 146 signals the customarily employed logic circuit in the on-board computer and/or microprocessor (not shown) that the control valving mechanism 10 is disposed appropriately for continued operation within the second drive ratio and also for shifting to the third drive ratio, as will be hereinafter described. The hydraulic state of the on/off solenoid control valves 22, 25 and 26, the hydraulic state of the three-way modulating solenoid valves 100 and 105, as well as the hydraulic state of the pressure sensing switches 78, 88 and 146 for the second drive ratio, are also depicted in the logic table represented in FIG. 11.

Thus, before the shift to the third drive ratio can be accomplished, the control valving mechanism 10 must be in the state represented by FIG. 4.

Providing a detailed description of the preparation for the second-to-third ratio shift at this location in the overall description, serves to emphasize that the position of the spool valve member 63 is irrelevant when operating in the second drive ratio, inasmuch as the off going pressure from the torque transfer friction device C1 exhausts through the first spool valve 60, irrespective of the position of the valve member 63. That is, if the first spool valve 60 is in the spring-set position, hydraulic fluid in the torque transfer device C1 will exit to the return system 90 through the exhaust conduit 91, as indicated by the arrows on FIG. 4. But even if the first spool valve 60 were pressure-set, the hydraulic fluid in the torque transfer device C1 would exit to the return system 90 through the exhaust conduit 103.

As a prerequisite to the shift into the third drive ratio it should be noted that the inhibit solenoid valve 22 remains hydraulically "on" to preclude a direct shift from the third drive ratio in the forward drive range to the reverse range.

Actuation of the Third Drive Ratio

The third drive ratio is established with the control valving mechanism 10 disposed in accordance with the representation in FIG. 4. That is, the on-going torque transfer device C3 is engaged and, in appropriate coordination therewith, the off-going torque transfer device C2 is disengaged. This sequencing from the second to the third drive ratio is controlled by opening the first modulating solenoid valve 100 to engage torque transfer device C3 and closing the second modulating solenoid valve 105 to effect depressurization of the torque transfer device C2 at a predetermined rate in order to effect the desired overlap.

When the second modulating solenoid valve 105 closes, the pressurized fluid within the torque transfer device C2 flows back along the second drive ratio conduit 139, through chamber 115B in the second spool valve 85, and along the transfer conduit 115B to enter the return system 90 through the exhaust conduit 155, as shown in FIG. 4.

Opening the first modulating control valve 100 permits the flow of pressurized fluid to pass from the branch feed passage $106_A$ into the control valving mechanism 10. Specifically, the fluid flow is directed from the first modulating solenoid valve 100 via the transfer conduit 101 into subchamber 65B in the first spool valve 60. The subchamber 65B is now in fluid communication with the torque transfer device C3 through the third-/reverse drive ratio conduit 108. The pressurized hydraulic fluid admitted to the control valving mechanism 10 through the first modulating solenoid valve 100 thus activates the third drive ratio.

The line pressure described to actuate the torque transfer device C3 by opening the first modulating solenoid 100 is depicted by the stippling in FIG. 5. Before discussing FIG. 5, however, it can be observed that with the components disposed as depicted in FIG. 4, one can also effect a downshift from the third to the second drive ratio simply by closing the first modulating solenoid valve 100 and opening the second solenoid valve 105. It should also be appreciated that the position of the spool member 112 is irrelevant when operating in the third drive ratio of the forward range, inasmuch as the off-going pressure from the torque transfer device C2 exhausts through the second spool valve 85 in either position of the spool member. That is, the hydraulic fluid exits to the return system 90 through exhaust conduit 155 if the stool member 112 is in the pressure-set position, or through exhaust conduit 130 if the spool member 112 is in the spring-set position.

Once the aforesaid shift to the third drive ratio is completed—but only after the on-board computer and-/or microprocessor has signalled (as a part of the pre-shift logic) that preparation for the shift from the third to the fourth drive ratio should be instituted—the second on/off shift control solenoid valve 26 is turned "off" so that the passage of hydraulic fluid therethrough is precluded (FIG. 5).

Turning the second solenoid valve 26 "off" causes the hydraulic fluid in control chamber 116, particularly in response to the biasing action of spring 119, to backflow through feed passage 151 into the second solenoid valve 26. From the second solenoid valve 26 the fluid exits into the return system 90 through exhaust conduit 162.

With both shift control solenoides 25 and 26 closed, both the first and second spool valves 60 and 85 revert to the spring-set position, as depicted in FIG. 5.

Here, too, the solenoid inhibit valve 22 remains "on", and the sensor 88 is not pressurized. Under these conditions, and with both spool valves 60 and 84 in the spring-set position, activation of either sensor 78 or 146 is precluded. The lack of activation by either sensor 78 or sensor 146 signals the customarily employed logic circuit (not shown) that the control valving mechanism 10 is disposed appropriately for continued operation in the third drive ratio and subsequent actuation of the fourth drive ratio. That is, before the fourth drive ratio can be accomplished, the control valving mechanism 10 must be in the state represented in FIG. 5.

The hydraulic state of the on/off solenoid control valves 22, 25 and 26, the hydraulic state of the three-way modulating solenoid valves 100 and 105, as well as the hydraulic state of the pressure sensing switches 78, 88 and 146, are depicted in the logic table represented in FIG. 11.

Actuation of the Fourth Drive Ratio

The fourth drive ratio is established with the control valving mechanism 10 disposed in accordance with the representation in FIG. 5. That is, the on-going torque transfer device C4 is engaged and, in appropriate coordination therewith, the off-going torque transfer device C3 is disengaged. This sequencing from the third to the fourth drive ratio is controlled by opening the second three-way modulating solenoid valve 105 so that pressurized hydraulic fluid can pass from the branch passage 106$_B$ into the control valving mechanism 10. Specifically, fluid flow is directed from the second three-way modulating solenoid valve 105 via the transfer conduit 153 into subchamber 115B through annular port 154. The subchamber 115B is now in fluid communication with the torque transfer friction device C4 through the fourth drive ratio feed conduit 140, which communicates with subchamber 115B through annular port 144. The pressurized hydraulic fluid admitted to the control valving mechanism. 10 through the three-way modulating solenoid valve 105 thus activates the fourth drive ratio.

Closing the first three-way modulating solenoid valve 100 allows the pressurized hydraulic fluid in the torque transfer device C3 to backflow along the third-/reverse drive ratio conduit 108 and through the subchamber 65B in the first spool valve 60 and along the transfer conduit 101 into the first modulating solenoid valve 100. From the first modulating solenoid valve 100, the fluid exits into the return system 90 through exhaust conduit 103.

Figure 6:
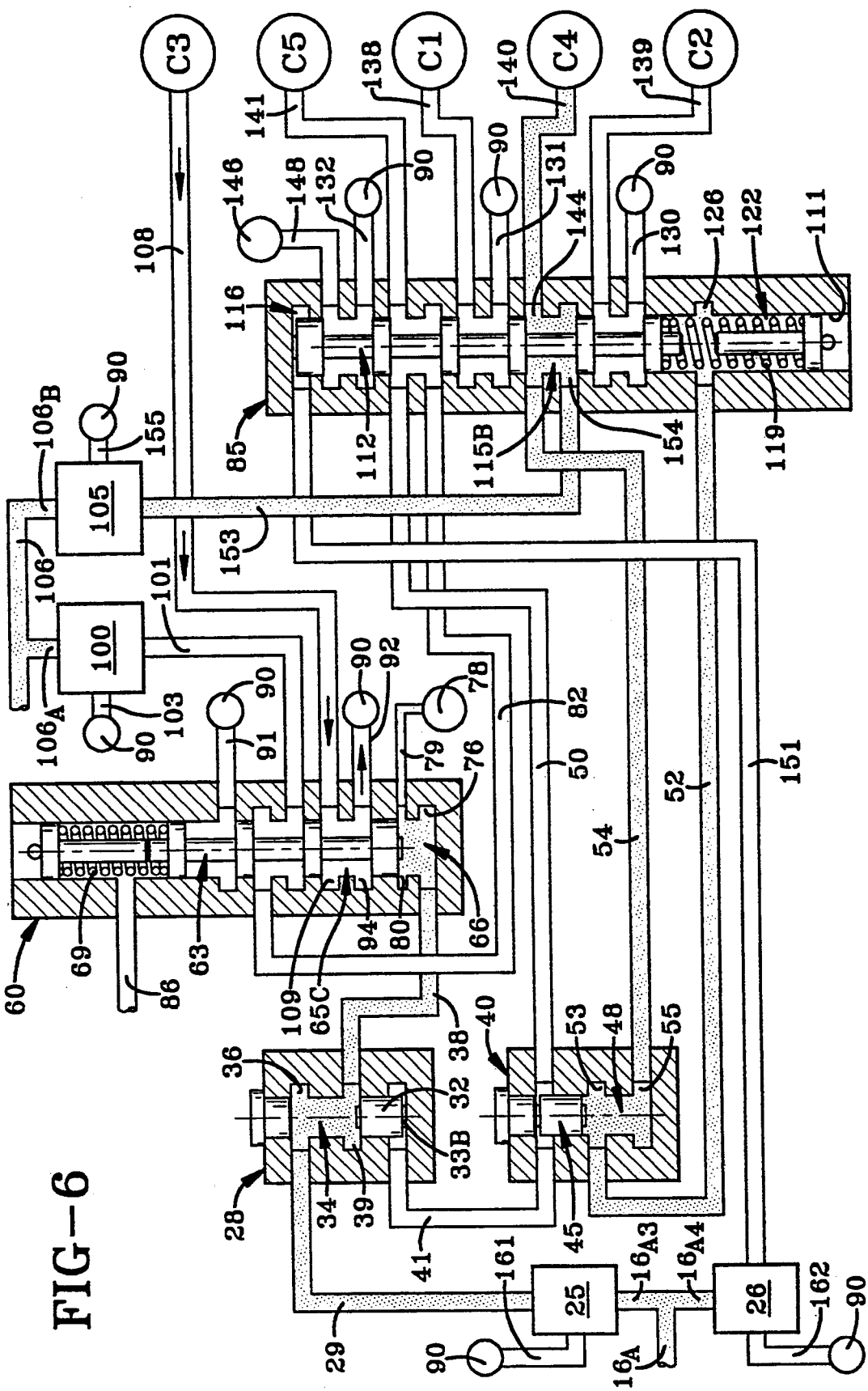
FIG. 6 is a view similar to FIGS. 3 through 5, but with the valving arrangement depicted to effect operation of the transmission in the fourth drive ratio.

The line pressure described to actuate the torque transfer device C4 by opening the second modulating solenoid valve 105 is depicted by the stippling in FIG. 6. Before discussing FIG. 6, however, it can be observed that with the components disposed as depicted in FIG. 5, one can also effect a downshift from the fourth drive ratio to the third drive ratio simply by closing the second modulating solenoid 105 and opening the first modulating solenoid 100. Thus, the position of the spool member 63 is irrelevant when operating in the fourth drive ratio of the forward drive range inasmuch as the off-going pressure from torque transfer device 63 exhausts through the first spool valve 60 in either position of the spool member 63. That is, the hydraulic fluid exits to the return system 90 through exhaust conduit 92, as shown by the arrows in FIG. 6, if the spool member 63 is in the pressure-set position or through exhaust conduit 103 if the spool member 63 is in the spring-set position (FIG. 5).

In order to prevent undesirable shifting combinations—such as a shift from the fourth to the second drive ratio when the appropriate synchronizers are mounted on the same shaft—means have been incorporated to assure that such a shift will not be possible. To that end, the present control 10 utilizes a hydraulic interlock—i.e.: pressurization of the spring assist chamber 122, as is also depicted on FIG. 6. Specifically, the pressurized hydraulic fluid received in subchamber 115B to actuate the torque transfer device C4 is also transferred, through blocking signal conduit 54, into chamber 48 in the second shuttle valve 40. The blocking signal conduit 54 opens into chamber 48 through port 55. The pressurization of chamber 48 causes the shuttle member 45 to move "upwardly", as viewed in FIG. 6, such that the chamber 48 will communicate with one end of the spring-assist conduit 52, through port 53. The other end of the spring-assist conduit 52 communicates with the spring-assist chamber 122, as through port 126. Pressurization of the spring-assist chamber 122 forces the spool member 112 to remain in the spring-set position, thereby precluding the passage of pressurized hydraulic fluid into the second drive ratio torque transfer device C2. This arrangement thereby precludes a fourth-to-second shift.

Once the aforesaid shift to the fourth drive ratio is completed—but only after the on-board computer and/or microprocessor has signalled (as a part of the pre-shift logic) that preparation for the shift from the fourth to the fifth drive ratio should be instituted—the first on/off shift control solenoid 25 is turned "on", as depicted in FIG. 6, so that pressurized hydraulic fluid can flow therethrough, and the second on/off shift control valve 26 is turned "off" so that the passage of hydraulic fluid therethrough is precluded.

Turning the first on/off solenoid control valve 25 "on" causes the pressurized hydraulic fluid to pass from the first control valve 25 along the feed passage 29 and into the chamber 34 in the first shuttle valve 28, thereby moving the shuttle member 32 to the "down" position, as depicted in FIG. 6, so that the chamber 34 will communicate with control conduit 38 to pressurize control chamber 66 in the first spool valve 60. That is, fluid enters the spool valve 60 through annular port 76 and floods the control chamber 66, thereby translating the spool member 63 to the pressure-set position and triggering the pressure switch 78.

The second spool valve 85 remains in the spring-set state so that the sensor 146 is not actuated; nor is sensor 88 activated. Activation of only sensor 78 signals the customarily employed logic circuit (not shown) that the control valving mechanism 10 is disposed appropriately for continued operation of the fourth drive ratio and subsequent actuation of the fifth drive ratio. The hydraulic state of the on/off solenoid control valves 22, 25 and 26, the hydraulic state of the three-way modulating solenoid valves 100 and 105, as well as the hydraulic state of the pressure sensing switches 78, 88 and 146, are depicted in the logic table represented in FIG. 11.

Actuation of the Fifth Drive Ratio

Figure 7:
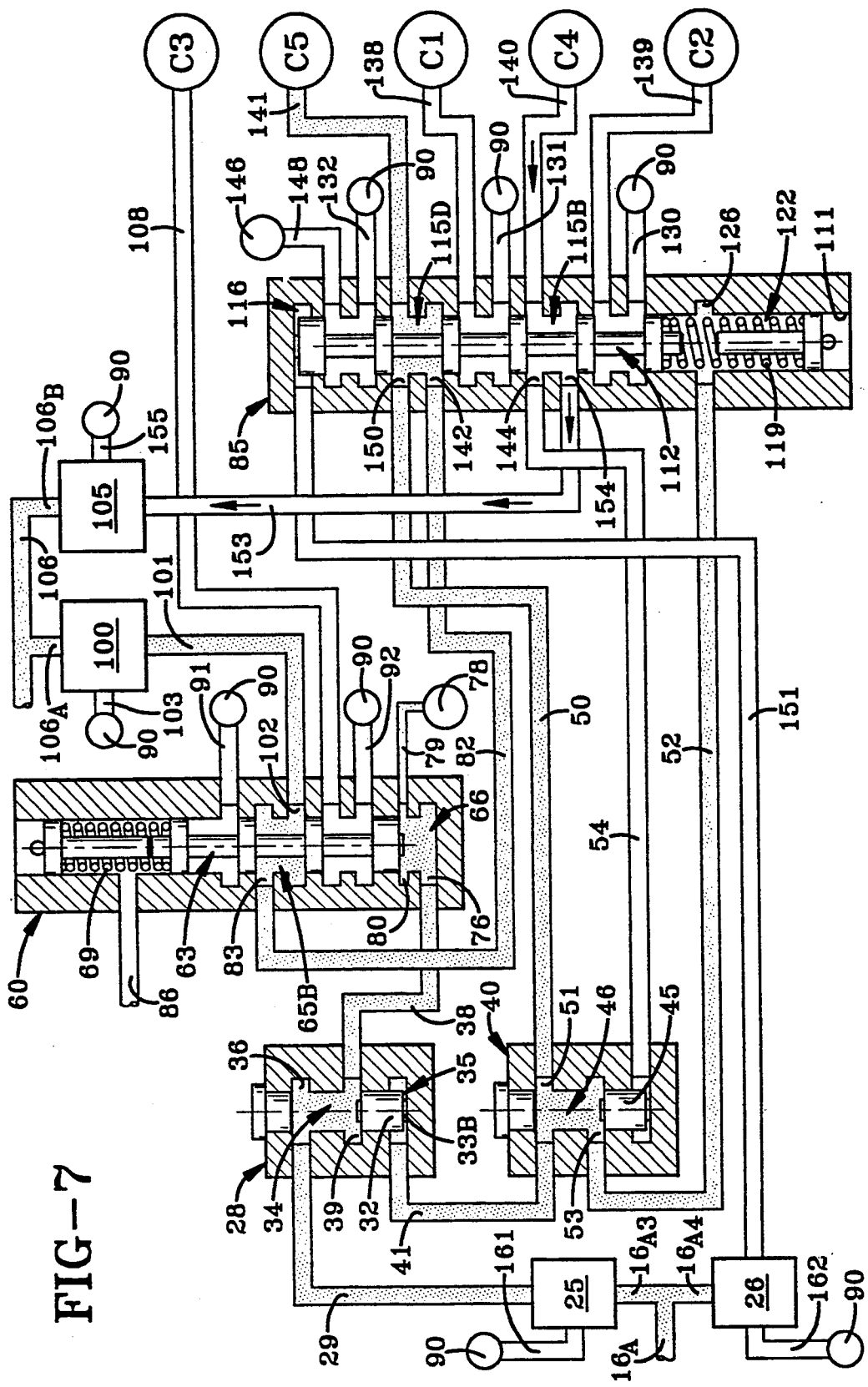
FIG. 7 is a view similar to FIGS. 3 through 6, but with the valving arrangement depicted to effect operation of the transmission in the fifth drive ratio.

The fifth drive ratio is established with the control valving mechanism 10 disposed in accordance with the representation in FIGS. 6 and 7. That is, the on-going torque transfer device C5 is engaged and, in appropriate coordination therewith, the off-going torque transfer device C4 is disengaged. This sequencing from the fourth to the fifth drive ratio is controlled by opening the first modulating solenoid valve 100 to engage the torque transfer device C5 and closing the second modulating solenoid valve 105 to effect depressurization of the torque transfer device C4 at a predetermined rate to effect the desired overlap.

Closing the second modulating solenoid valve 105 permits depressurization of the torque transfer device C4 at a predetermined rate to effect the desired overlap with respect to the opening of the first modulating solenoid valve 100. When the second modulating solenoid valve 105 closes, the pressurized hydraulic fluid in the off-going fourth drive ratio torque transfer device C4 backflows through the subchamber 115B which communicates with the second three-way modulating solenoid valve 105 through transfer conduit 153. Inasmuch as the second three-way modulating solenoid valve 105 is hydraulically "off" when the control 10 actuates the fifth drive ratio, the transfer conduit 153 will discharge the hydraulic fluid from torque transfer device C4 through the exhaust conduit 155 into the return system 90. This backflow is represented by the arrows in FIG. 7.

Opening the first modulating solenoid valve 100 introduces pressurized hydraulic fluid from the feed branch $106_A$ into the control valving mechanism 10. That is, the pressurized hydraulic fluid passes through the transfer conduit 101 and into subchamber 65B in the first spool valve 60 through annular port 102. The subchamber 65B is in fluid communication with subchamber 115D in the second spool valve 85 through the first/fifth drive ratio conduit 82. The subchamber 115D, in turn, communicates with torque transfer friction device C5 through the fifth drive ratio feed conduit 141, which communicates with subchamber 115D through annular port 145. The pressurized hydraulic fluid admitted to the control valving mechanism 10 through three-way modulating solenoid valve 100, thus activates the fifth drive ratio torque transfer device C5. The line pressure described to actuate torque transfer device C5 by opening the first modulating solenoid valve 100 is depicted by the stippling in FIG. 7.

As represented in FIG. 7, pressurized hydraulic fluid continues to flow from the first on/off solenoid shift control valve 25 into the control chamber 66 in order to maintain the pressure-set disposition of the spool member 63 in the first spool valve 60 and continue actuation of the pressure switch 78.

In addition, pressurized hydraulic fluid also flows out of the subchamber 115D and into the signal conduit 50. From the signal conduit 50, the hydraulic fluid enters chamber 46 of the second shuttle valve 40, thereby translating the shuttle member 45 into the "down" position depicted in FIG. 7. The pressurized fluid in chamber 46 is available to chamber 35 in the first shuttle valve 28, but the shuttle member 32 remains in the "down" position, inasmuch as chamber 34 was previously pressurized.

Even in the "down" position of the shuttle member 45 in the second shuttle valve 40, hydraulic fluid will continue to pressurize the spring-assist chamber 122 in the second spool valve 85. Pressurization of the spring-assist chamber 122 assures that during any overlap between the activation of torque transfer device C5 and the deactivation of torque transfer device C4, the pressurized fluid which might momentarily exist in both subchambers 115D and 115B will not overcome the biasing action of spring 119 and allow the spool member 112 to dislodge, even temporarily, from the spring-set position.

Operation Under Loss of Electrical Energy

It is important to note that the on/off solenoid control valves 25 and 26, along with the second three-way modulating solenoid valve 105 and the on/off inhibit solenoid valve 22, will be normally closed—i.e.: hydraulically "off", such that no flow is permitted between the line pressure side of the valve and the outlet of the valve when they are not electrically energized. However, the three-way modulating solenoid valve 100 is normally open—i.e.:it is hydraulically "on" when not electrically energized, such that hydraulic fluid will flow from the line pressurize side of that valve to the outlet thereof even if no electrical energy is available. The use of a normally open configuration for the first three-way modulating solenoid valve 100, facilitates the provision of a desired operational failure mode for the control 10 wheat the system experiences a loss of electrical power. The use of a normally closed on/off solenoid inhibit valve 22 in the control 10 permits a shift from the third drive ratio into reverse, even with a loss of power.

The present control 10 is designed to default to the third drive ratio during a loss of electrical energy when the transmission is operating in the first, second, third or fourth forward drive ratios. The present control 10 also defaults to the fifth drive ratio should the loss of electrical energy occur during operation in the fifth forward drive ratio.

With reference to FIG. 3 then, a loss of electrical power while operating in the first drive ratio will close the first on/off solenoid control valve 25. Upon closure of solenoid valve 25, the pressurized fluid within control chamber 66 in the first spool valve 60 will, under the biasing action of the spring 69, flow back along control conduit 38, through chamber 34 in the first shuttle valve 28, along feed passage 29 and into the return system 90 through exhaust conduit 161. In response to the pressure elimination in control chamber 66, the spring member 69 will place the first spool valve 60 in the spring-set state.

With the first spool valve 60 in the spring-set state, and because the first three-way modulating solenoid valve 100 is normally open, the loss of electrical energy when the control 10 is operating in the first drive ratio, as depicted in FIG. 3, will, as just described, automatically place the control 10 in the condition depicted in FIG. 5, thereby effecting a shift to the third drive ratio in response to an electrical failure while operating in the first drive ratio.

With reference to FIG. 4 then, it will be seen that a loss of electrical power while operating in the second drive ratio will cause both the second on/off solenoid valve 26 and the second three-way modulating solenoid valve 105 to revert to their normally closed state. As such, the pressurized fluid downstream of both the second on/off solenoid valve 26 and the second three-way modulating solenoid valve 105 will thereby flow back to the respective valves 26 and 105 and into the return system through the respective exhaust conduits 162 and 155.

With continued reference to FIG. 4, it should be appreciated that the return of the solenoid valve 26 to its "off" state allows the biasing pressure applied by the spring 119 in the second spool valve 85 to return that valve to its spring-set disposition. Even if that occurs before the second drive ratio torque transfer device C2 has exhausted all of the pressurized fluid therein, the spring-set position of the second spool valve 85 continues to maintain hydraulic communication between the torque transfer device C2 and the return system 90. As depicted in FIG. 5, the second drive ratio feed conduit 139 communicates with the return system 90 through the exhaust conduit 130 when the second spool valve 85 is in the spring-set state. Specifically, both the exhaust conduit 130 and the feed conduit 139 communicate with subchamber 115B.

Here, too, the loss of electrical energy to the on/off solenoid inhibitor valve 22 has the same effect, as described previously, with respect to a loss of electrical energy when operating in the first drive ratio. As such, the control system 10 automatically reverts to the third drive ratio in response to an electrical failure while operating in the second drive ratio.

Operation in the third drive ratio requires no electrical actuation of any solenoid. Accordingly, a loss of electrical energy while operating in the third drive ratio will effect no change in the operation of the transmission.

With reference to FIG. 6 then, it will be seen that a loss of electrical power while operating in the fourth drive ratio will cause both the first on/off solenoid valve 25 and the second three-way modulating solenoid valve 105 to revert to their normally closed state. As such, the pressurized fluid downstream of both the second on/off solenoid valve 25 and the three-way modulating solenoid valve 105 will thereby flow back to the respective valves 25 and 105 and into the return system 90 through the respective exhaust conduits 161 and 155.

With continued reference to FIG. 6, it should be appreciated that the return of the first on/off solenoid valve 25 to its "off" state allows the biasing pressure applied by the spring 69 in the first spool valve 60 to return that valve to its spring-set disposition. Specifically, the pressurized fluid within control chamber 66 in the first spool valve 60 will, under the biasing action of the spring 69, flow back along control conduit 38, through chamber 34 in the first shuttle valve 28, along feed passage 29 and into the return system 90 through exhaust conduit 161. In response to the pressure elimination in control chamber 66, the spring member 69 will place the first spool valve 60 in the spring-set state. With the first spool valve 60 in the spring-set state, and because the first three-way modulating solenoid valve 100 is normally open, the loss of electrical energy when the control 10 is operating in the fourth drive ratio, as depicted in FIG. 6, will, as just described, automatically place the control 10 in the condition depicted in FIG. 5, thereby effecting a shift to the third drive ratio in response to an electrical failure while operating in the fourth drive ratio.

Conversely, a loss of electrical power while in the fifth drive ratio (FIG. 7) would cause the first on/off solenoid valve 25 to close. Inasmuch as the closure of the first on/off solenoid valve 25 permits the pressurized fluid downstream of that valve to flow back through the valve to the return system 90 through exhaust conduit 161, one would expect the first spool valve 60 to assume the spring-set position as soon as the biasing action of the spring member 69 overcomes the anticipated loss of fluid pressure in the control chamber 66. However, when the transmission is operating in the fifth drive ratio, the control 10 provides for pressurized fluid to be fed back through the shuttle valves 40 and 28 to replenish the pressurized fluid within control chamber 66 and thereby maintain the first spool valve 60 in the pressure-set state.

Figure 8:
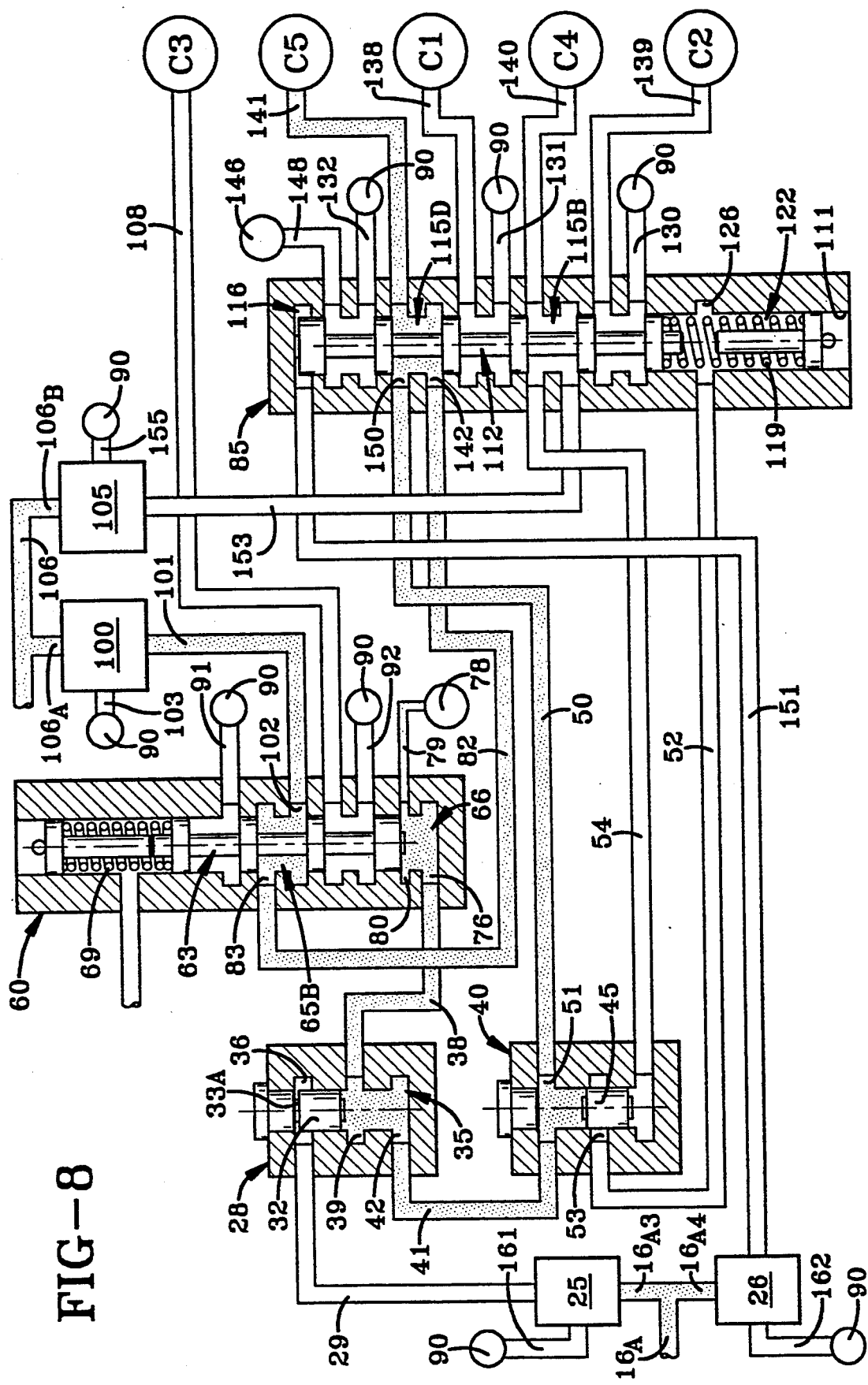
FIG. 8 is a view similar to FIG. 7, but with the valving arrangement depicted to effect operation of the transmission in the fifth drive ratio after a loss of electrical energy to the system.

Specifically, the pressurized fluid supplied to chamber 46 in the second shuttle valve 40 is feedback, through cross feed conduit 41, into chamber 35 in the first shuttle valve 28 so that the shuttle member 35 in the first shuttle valve 28 will move from the down position depicted in FIG. 7 to the up position depicted in FIG. 8, thereby assuring a virtually uninterrupted supply of pressurized fluid to the control chamber 66 even through the first on/off solenoid valve 25 has been closed. As such, the spool valve 60 is maintained in the pressure-set position despite the loss of electrical energy and the resulting closure of the first on/off solenoid valve 25.

Because the first spool valve 60 remains disposed in the spring-set state, and because the first three-way modulating solenoid valve 100 is a normally open valve, operation of the transmission in the fifth drive ratio will be maintained even should a loss of electrical energy while the transmission is operating in the fifth drive ratio. The transmission will go to neutral when selected, removing fluid pressure from the clutches and interlocks. When forward drive is subsequently selected, the third drive ratio will actuate.

Actuation of the Reverse Drive Range

Before embarking on a description as to the selection of at least the initial drive ratio for operation of the transmission in the reverse drive range, an explanation as to the hydraulic fluid flow accomplished by positioning the manual range selector valve 18 in the reverse drive position R (FIG. 9) appears in order. Specifically, the regulated line pressure fed from the pump 12 through the main feed conduit 16 passes through the manual range selector valve 18, along reverse supply conduit 176, and initially through the reverse flow control valve 21 and into the reverse fork actuation passage 178 to enter the reverse chamber 179 in the shift controller 19 (while the reverse flow control valve 21 and the shift controller 19 are disposed as depicted in FIG. 1). As soon as the shift controller 19 is moved to the reverse disposition, as depicted in FIG. 9, pressurized hydraulic fluid flows in signal conduit 86 to fill control subchamber 171 and thereby position the reverse flow control valve 21 in the pressure-set position depicted in FIG. 9. In the pressure-set position depicted in FIG. 9, the pressurized hydraulic fluid entering the reverse flow control valve 21 through the reverse supply conduit 196 flows into branch feed passage $106_D$ and through the high pressure selector shuttle valve 107 into feed passage 106. The pressurized hydraulic fluid is then presented at both the first and second three-way modulating solenoid valves 100 and 105 through branch passages $106_A$ and $106_B$, respectively.

In the arrangement described and depicted in FIG. 9, the hydraulic fluid passing through branch $16_{42}$ at regulated line pressure will access signal conduit 86 to pressurize sensor 88.

For those desiring a more detailed explanation as to the operation of the shift fork controller 19 in response to the aforementioned disposition of the manual range selector 18 in the reverse drive R position, reference should be had to the aforesaid, copending U.S. patent application Ser. No. 08/104,967.

Figure 10:
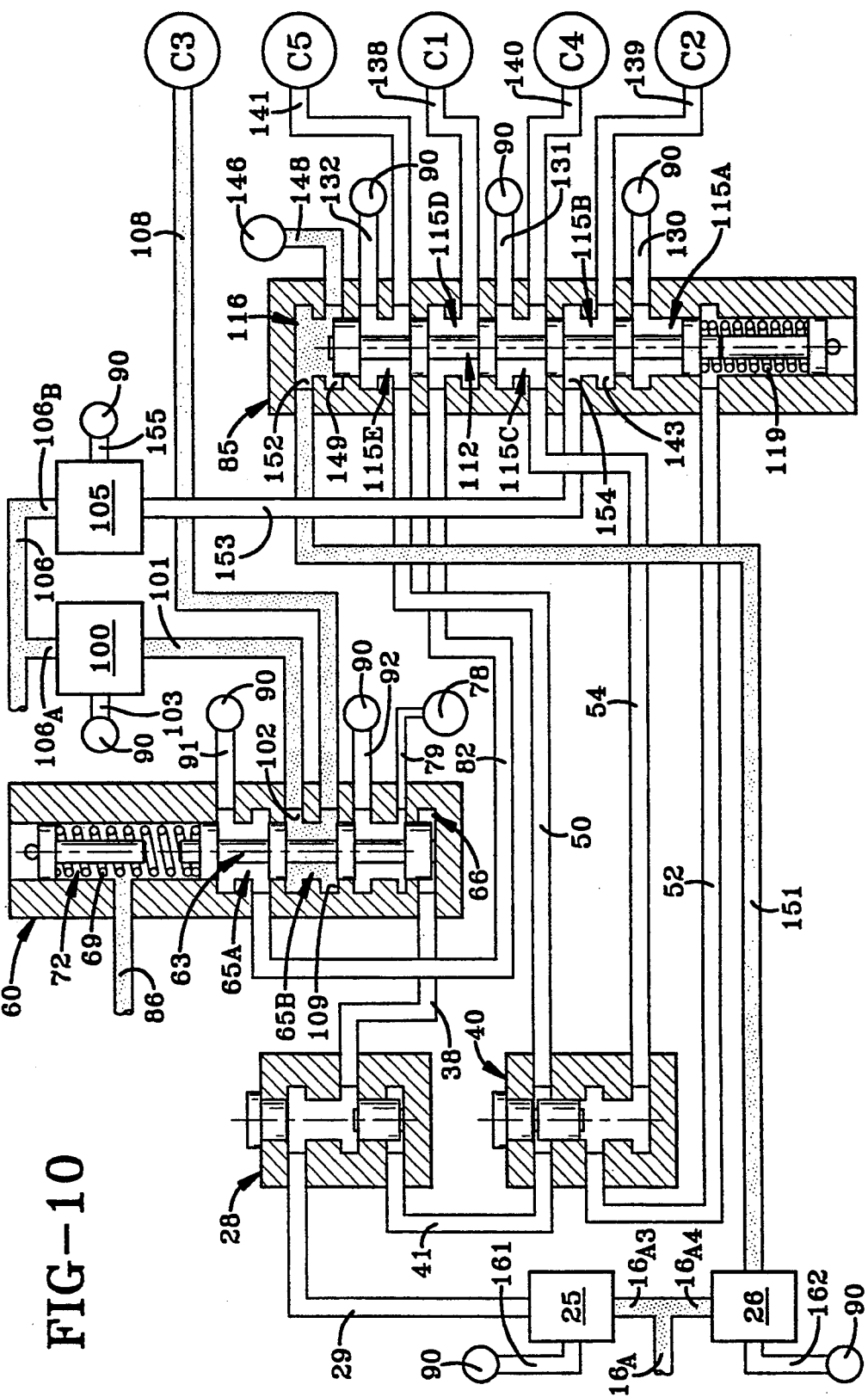
FIG. 10 is an enlarged area of FIG. 9 presented in cross-sectional elevation to focus more clearly on the control valving mechanism, and particularly the valving arrangement by which to control the on-coming and off-going fluid pressure to the torque transfer device by which the specific drive or gear ratio is selected for the reverse drive range condition.

With reference to FIGS. 9 and 10, torque transfer device C3 effects the reverse drive ratio when the manual range selector valve 18 is in the reverse drive position R. Operation of torque transfer device C3 is then effected by hydraulically closing the on/off solenoid valve 22 and opening solenoid valve 26 as well as the first three-way modulating solenoid valve 100. The first spool valve 60 is locked in the spring-set position, which is assured by having pressurized fluid introduced into the spring-assist chamber 72 through the appropriate conduits: i.e.: branch feed conduits $16_{41}$ and signal conduit 86. The second spool valve 85 is secured in the pressure-set position by the introduction of pressurized fluid into the control chamber 116 through the on/off solenoid valve 26. With the solenoid valves so positioned, the signal processor will show pressure in both sensor 88 and 146, and the first three-way modulating solenoid valve 100 will be hydraulically opened to permit the pressurized fluid to flow through transfer conduit 101 and subchamber 65B into the third/reverse conduit 108 to apply the torque transfer device C3.

Should electrical power be lost while operating the reverse drive range, the spool valve 60 will remain locked in the spring-set position by virtue of the spring member 69 itself, and also because the on/off solenoid 22 is normally closed. The first three-way modulating solenoid valve 100 is also normally open so that pressurized hydraulic fluid will continue to be available to the torque transfer device C3. On the other hand, the on/off solenoid valve 26 is normally closed so that the pressurized fluid in control chamber 116 will be drained back to the return system 90 through the exhaust conduit 162 that connects the on/off solenoid valve 26 to the return system 90. The absence of pressurized hydraulic fluid in control chamber 116 affects only the signal to the on-board computer and/or microprocessor, it will not affect operation within the reverse drive range.

CONCLUSION

The foregoing description of the exemplary embodiment of the invention has been presented for the purposes of illustration and description. It is not intended to be exhaustive or to limit the invention to the precise form disclosed. Obvious modifications or variations are possible in light of the above teachings. For example, it is contemplated that the shuttle valves 28 and 40 along with the spool valves 60 and 85 could be combined in a single housing with appropriate passageways incorporated therein. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

It should also be appreciated that the pressure sensor switches 78, 88 and 146 serve to verify the disposition of the spool valves 60 and 86 as well as the forward and reverse flow control valves 20 and 21, respectively, prior to actuation of the modulating solenoid valves 100 or 105 in order to detect an incorrect range or direction change prior to the shift. Some prior known electronic transmission controls utilize a speed check subsequent to the shift to verify the operating range or ratio, and by that time it is too late to effect the necessary correction.

While only a preferred embodiment of the present invention is disclosed, it is to be clearly understood that the same is susceptible to numerous changes apparent to one skilled in the art. Therefore, the scope of the present invention is not to be limited to the details shown and described, but is intended to include all changes and modifications which come within the scope of the appended claims.

As should now be apparent, the present invention teaches that an automatic transmission control embodying the concepts of the present invention is capable of providing a desirable delivery of actuating fluid to the torque transfer control devices, and accomplishes the other objects of the invention. As such, it should be appreciated from the foregoing description of the forward drive ratios that each ratio requires the engagement of a different friction torque transfer device. It should also be apparent from the foregoing description that the transition between successive forward ratios is accomplished by the disengagement of one of the friction torque transfer devices and the substantially simultaneous engagement of another friction torque transfer device. This is accomplished by a unique control system that employs two spool valves in combination with two modulating solenoid valves, as well as two on/off solenoid valves operating in conjunction with a pair of two-position shuttle valves.

In conclusion, the present invention not only teaches that an improved transmission control valve mechanism embodying the concepts of the present invention is capable of effecting selective sequencing of a five speed, twin countershaft, automatic transmission by using only two modulating valves to control the on-coming and off-going hydraulic pressures that are applied to activate and deactivate the torque transfer devices by which sequencing of the transmission through the drive ratios is effected, but also that the other objects of the invention can be likewise accomplished.

The embodiments of the invention in which an exclusive property or privilege is claimed are defined as follows:

1. An automatic transmission drive ratio control comprising:
   a source of fluid pressure;
   a first two-position spool valve means;
   a control chamber incorporated in said first spool valve means;
   first on/off solenoid control valve means connected with said source of fluid pressure;
   first control conduit means for directing fluid from said first on/off solenoid control means to said control chamber in the first spool valve means to effect a pressure-set state when said first on/off solenoid control valve means is on;
   spring means for biasing said first spool valve means to effect a spring-set state when said first on/off solenoid control valve means is off;
   a second two-position spool valve means;
   a control chamber incorporated in said second spool valve means;
   second on/off solenoid control valve means connected with said source of fluid pressure;
   second control conduit means for directing fluid from said second on/off solenoid control valve means to said control chamber in said second spool valve means for effecting a pressure-set state to said second spool valve mean when said second on/off solenoid control means is on;
   spring means for biasing said second spool valve means to effect a spring-set state to said second spool valve means when said second on/off solenoid control valve means is off;
   a plurality of torque transfer devices;
   each torque transfer device effecting a selected drive ratio;
   first modulating solenoid valve means connected to said source of fluid pressure and to said first spool valve means for directing fluid flow to selected torque transfer devices; and, second modulating solenoid valve means connected to said source of fluid pressure and to said second spool valve means for directing fluid flow to selected of the other torque transfer devices.

2. An automatic transmission drive ratio control, as set forth in claim 1, wherein said first spool valve means further comprises:
a hydraulic return system means; and,
a first axially extending spool valve member having a plurality of lands spaced axially therealong to define first, second and third subchambers.

3. An automatic transmission control, as set forth in claim 2, wherein:
said first subchamber is in selective fluid communication with:
said hydraulic return system means; and,
said second spool valve member;
said second subchamber is in selective fluid communication with:
said first modulating solenoid valve means;
said torque transfer device that effects the third drive ratio; and,
said second spool valve means; and,
said third subchamber is in selective fluid communication with:
said hydraulic return system means; and,
said torque transfer device that effects the third drive ratio.

4. An automatic transmission control, as set forth in claim 3, wherein said second spool valve means further comprises:
a second axially extending spool valve member having a plurality of lands spaced axially therealong to define first, second, third, fourth and fifth subchambers.

5. An automatic transmission control, as set forth in claim 4 wherein:
said torque transfer devices communicates with said second spool valve to effect the first, second, fourth and fifth drive ratios;
said first subchamber in said second spool valve means selectively communicates with:
said torque transfer device that effects fifth drive ratio; and,
said hydraulic return system means;
said second subchamber in said second spool valve means selectively communicates with:
said first spool valve means, said torque transfer device that effects the first drive ratio;
said torque transfer device that effects said fifth torque drive ratio; and,
said hydraulic return system means;
said third subchamber in said second spool valve means selectively communicates with:
said torque transfer device that effects the first drive ratio;
said torque transfer device that effects the fourth drive ratio; and,
said hydraulic return system means;
said fourth subchamber in said second spool valve means selectively communicates with:
said second modulating solenoid means;
said torque transfer device that effects the second drive ratio; and,
said torque transfer device that effects the fourth drive ratio; and,
said fifth subchamber in said second spool valve means selectively communicates with:
said hydraulic return system means; and,
said torque transfer device that effects the second drive ratio.

6. An automatic transmission control, as set forth in claim 5, wherein selective actuation of said first and second on/off solenoid control valve means and said first and second modulating solenoid valve means allows fluid flow to be directed exclusively to a selected torque transfer device.

7. An automatic transmission drive ratio control in combination with a forward/reverse shift control mechanism, the combination employing a source of fluid pressure, said forward/reverse shift control mechanism having:
fluid operated forward/reverse shift controller means connected with the source of fluid pressure;
manual shift valve means connected with the source of fluid pressure for selecting a plurality of operating conditions;
first flow control valve means for directing fluid from the manual shift valve means to said shift controller means for effecting a first position therein when the manual valve is in the forward drive condition;
second flow control valve means for directing fluid from the manual shift valve means to said shift controller means for effecting a second position therein when the manual valve is in the reverse drive condition;
said drive ratio control comprising:
a first two-position spool valve means;
a control chamber incorporated in said first spool valve means;
first on/off solenoid control valve means connected with the source of fluid pressure;
first control conduit means for directing fluid from said first on/off solenoid control means to said control chamber in said first spool valve means to effect a pressure-set state when said first on/off solenoid control valve means is on;
spring means for biasing said first spool valve means to effect a spring-set state when said first on/off solenoid control valve means is off;
a second two-position spool valve means;
a control chamber incorporated in said second spool valve means;
second on/off solenoid control valve means connected with the source of fluid pressure;
second control conduit means for directing fluid from said second on/off solenoid control valve means to said control chamber in said second spool valve means for effecting a pressure-set state to said second spool valve means when said second on/off solenoid control means is on;
spring means for biasing said second spool valve means to effect a spring-set state to said second spool valve means when said second on/off solenoid control valve means is off;
a plurality of torque transfer devices;
each torque transfer device effecting a selected drive ratio;
first modulating solenoid valve means interposed between the source of fluid pressure and said first spool valve means for directing fluid flow to selected torque transfer devices; and,
second modulating solenoid means connected to the source of fluid pressure are and to said second spool valve means for directing fluid flow to selected of the other torque transfer devices.

8. An automatic transmission control, as set forth in claim 7, wherein said second flow control valve further comprises:
   a housing;
   a spool valve member received within said housing for axial reciprocation;
   a plug member received within said housing for axial displacement;
   biasing means to move said spool member to a spring-set position;
   said second flow control valve effecting communication between said manual shift valve means and said forward/reverse shift controller means when said spool valve member in said second flow control valve is in said spring-set position;
   a signal control subchamber within said housing and disposed between said spool valve member and said plug member selectively to displace said spool member with respect to said plug member;
   said second flow control valve effecting communication between said manual shift valve means and said modulating solenoid valves when said second flow control valve member is in said pressure-set position.

9. An automatic transmission control, as set forth in claim 8, wherein said second flow control valve further comprises:
   a control subchamber within said housing selectively to displace said plug member, and thereby said spool member, to the pressure-set position.

10. An automatic transmission control, as set forth in claim 9, wherein:
    said signal control subchamber receives pressurized hydraulic fluid from said shift controller means when said shift controller means is in a selected position;
    a pressure sensor to determine the pressure state of said signal control subchamber.

11. An automatic transmission control, as set forth in claim 10, further comprising:
    an on/off inhibit solenoid valve selectively to provide pressurized hydraulic fluid to said control subchamber.

12. A hydraulic control for operating an automatic transmission having five drive ratios, the hydraulic control comprising:
    a source of pressurized hydraulic fluid;
    first and second on/off solenoid control valves;
    each said on/off solenoid control valve communicating with said source of pressurized hydraulic fluid;
    first and second spool valves each having two positional states;
    first and second shuttle valves each having two positional states;
    a network of conduit means communicating between said on/off solenoid control valves, said shuttle valves and said spool valves to control the positional state of each said shuttle valve as well as each said spool valve;
    first and second modulating solenoid valves;
    five torque transfer devices;
    each torque transfer device to select one drive ratio;
    a second network of conduit means to communicate between said modulating solenoid valves, said spool valves and said torque transfer devices selectively to deliver pressurized hydraulic fluid from a selected modulating solenoid valve to a selected torque transfer device in a selected sequence.

* * * * *